Jan. 12, 1960

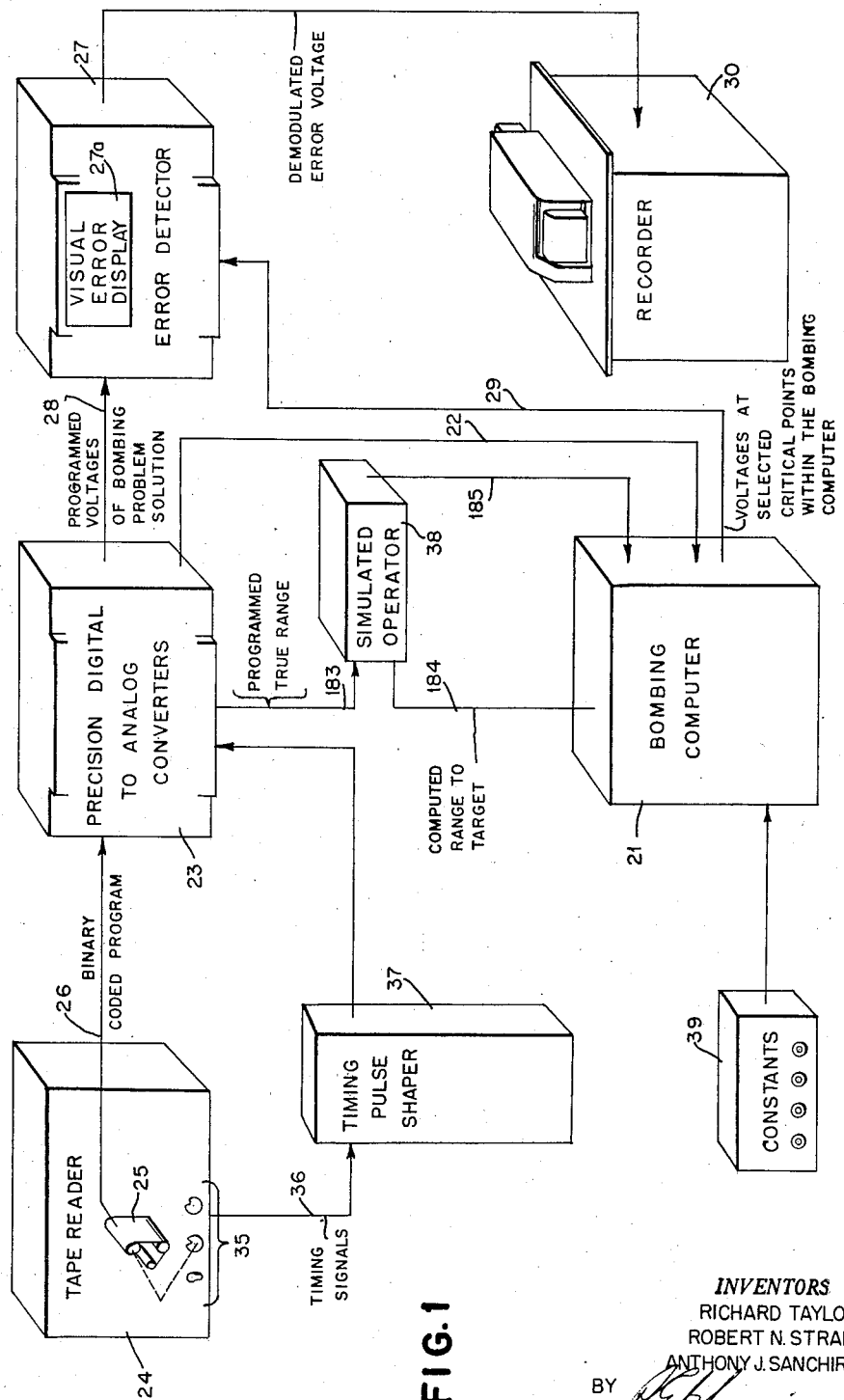

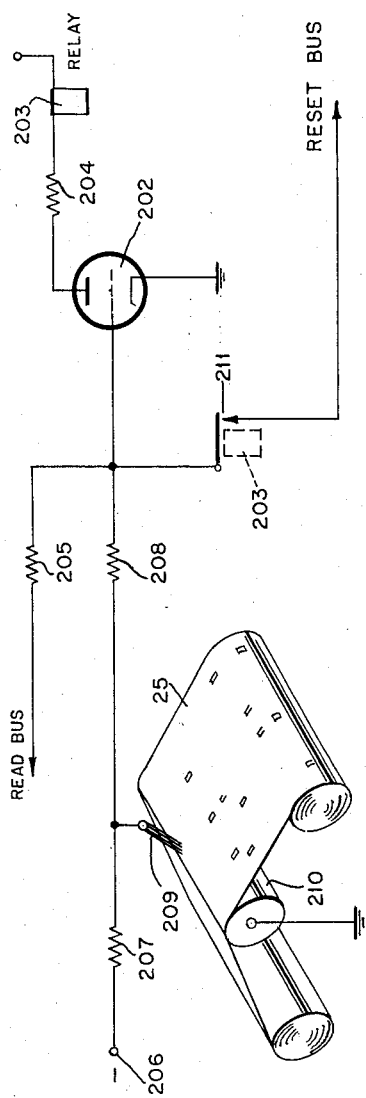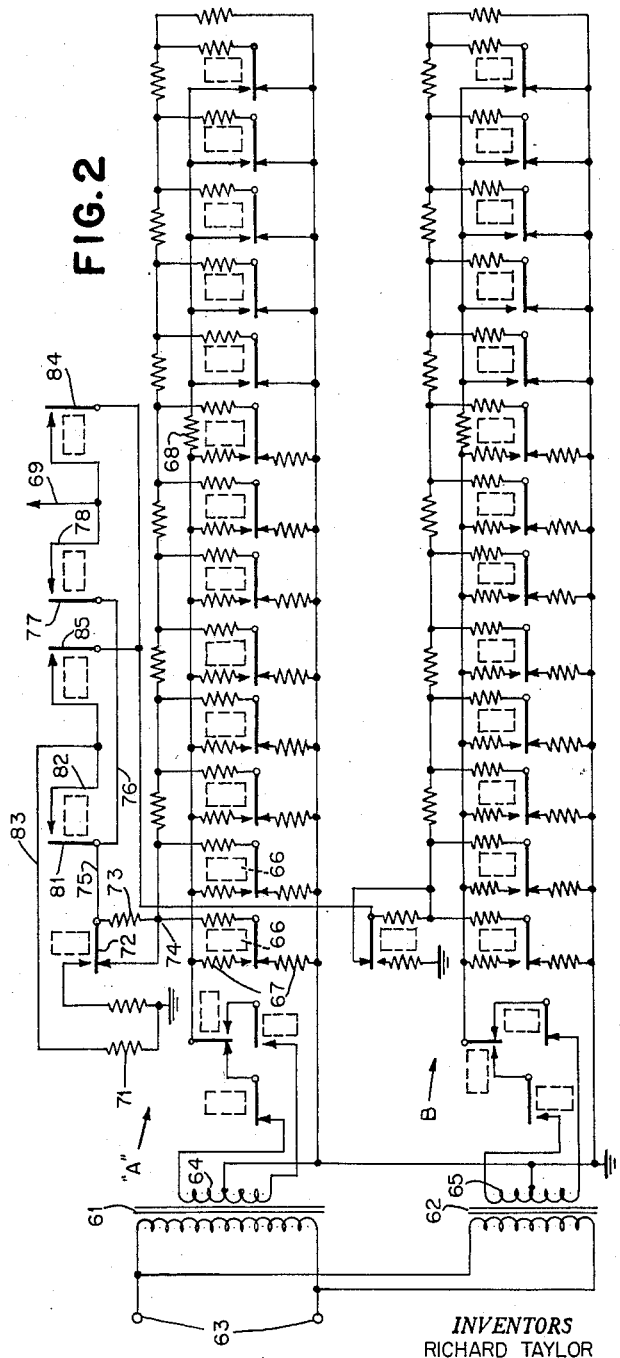

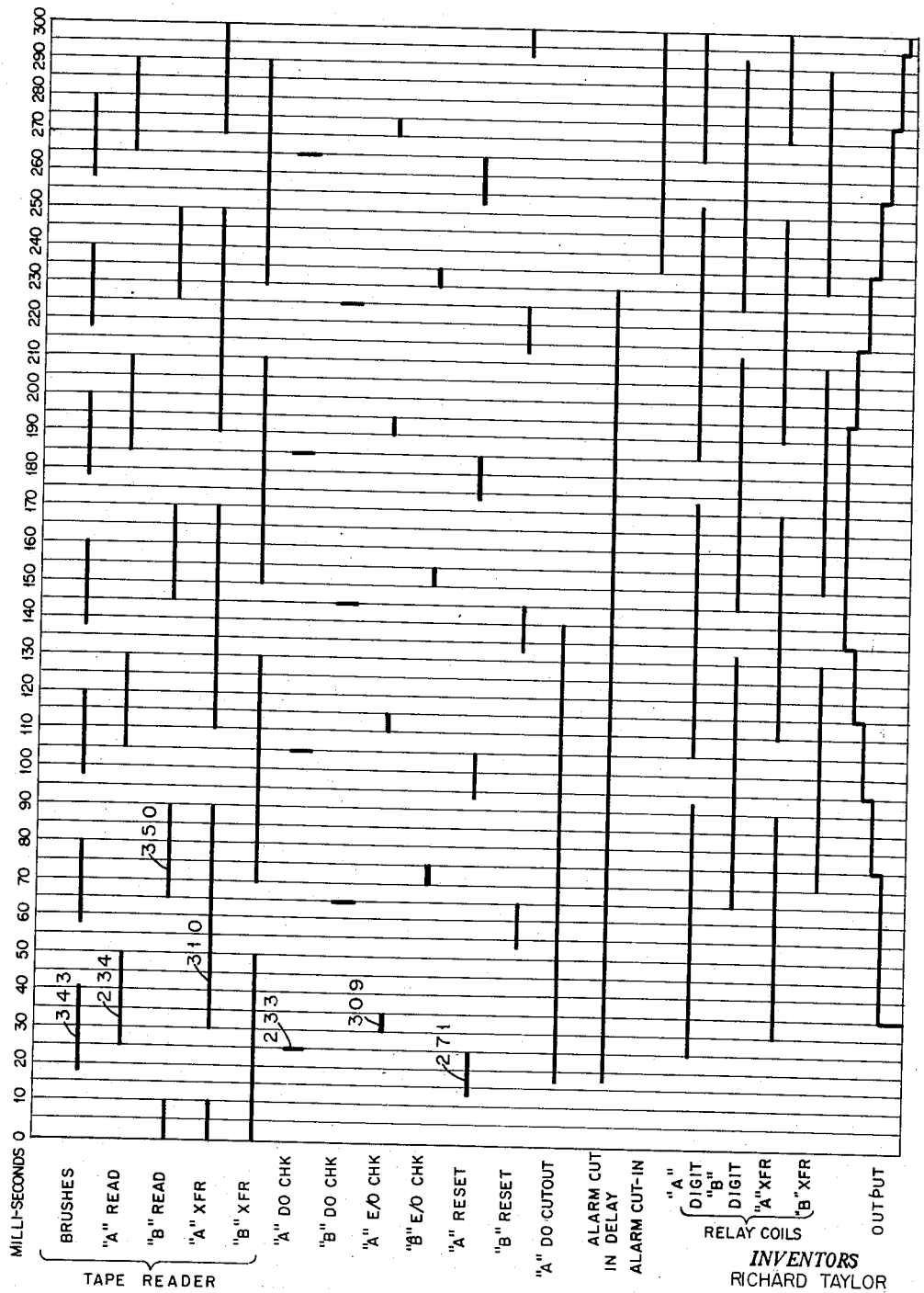

R. TAYLOR ET AL 2,920,818

DYNAMIC EVALUATOR

Filed Dec. 31, 1954

INVENTORS
RICHARD TAYLOR
ROBERT N. STRAEHL
ANTHONY J. SANCHIRICO
BY

ATTORNEY

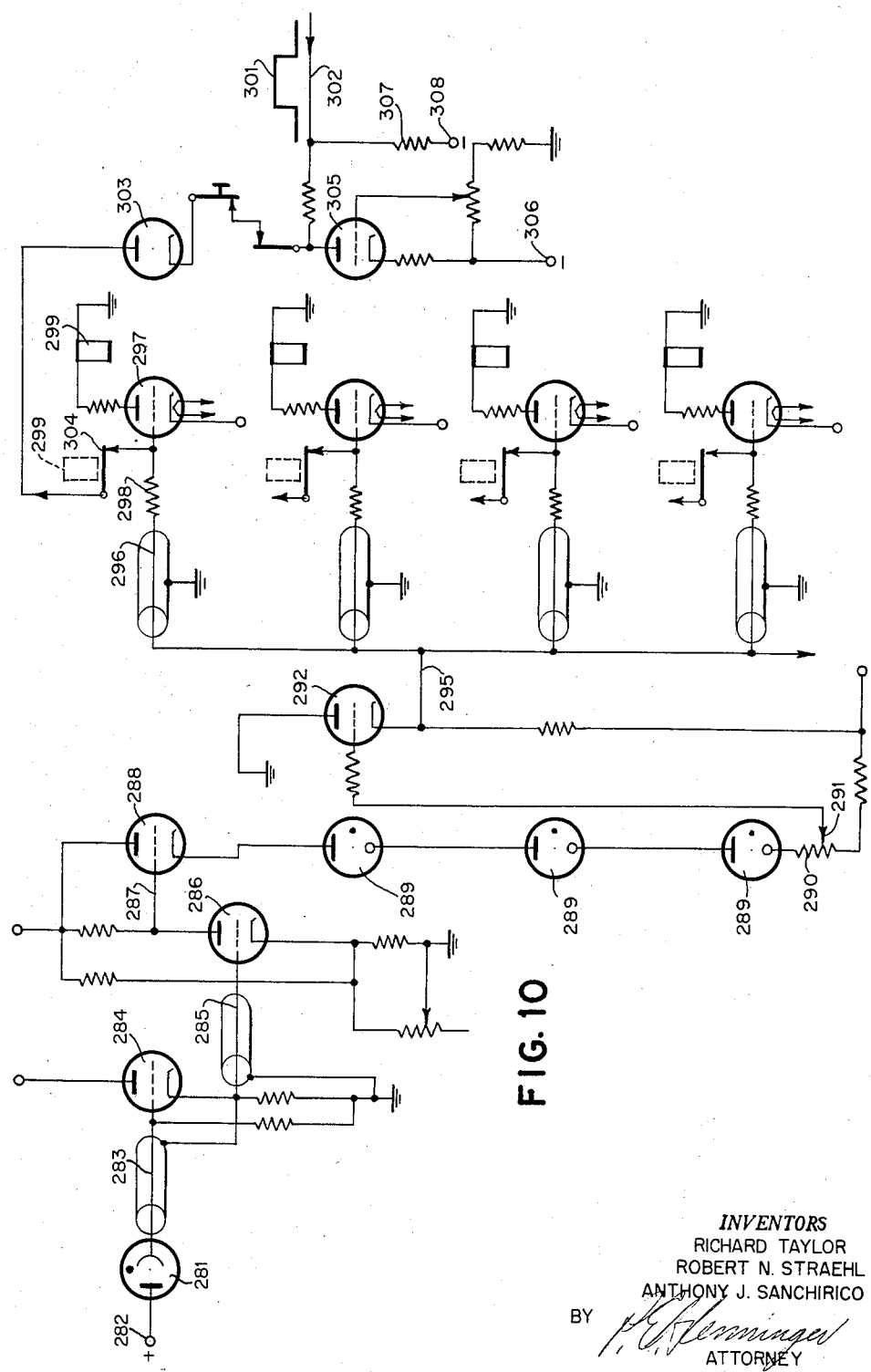

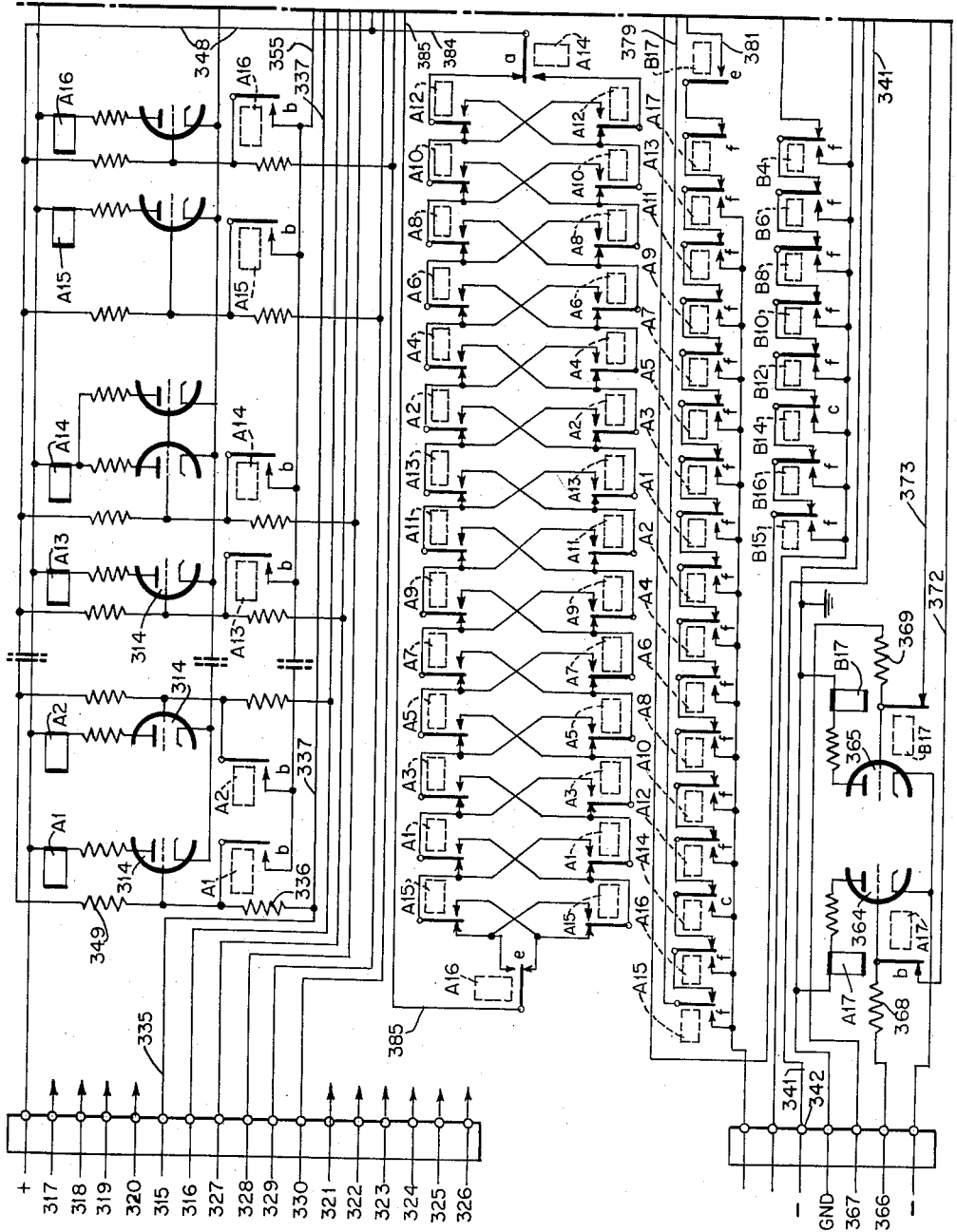

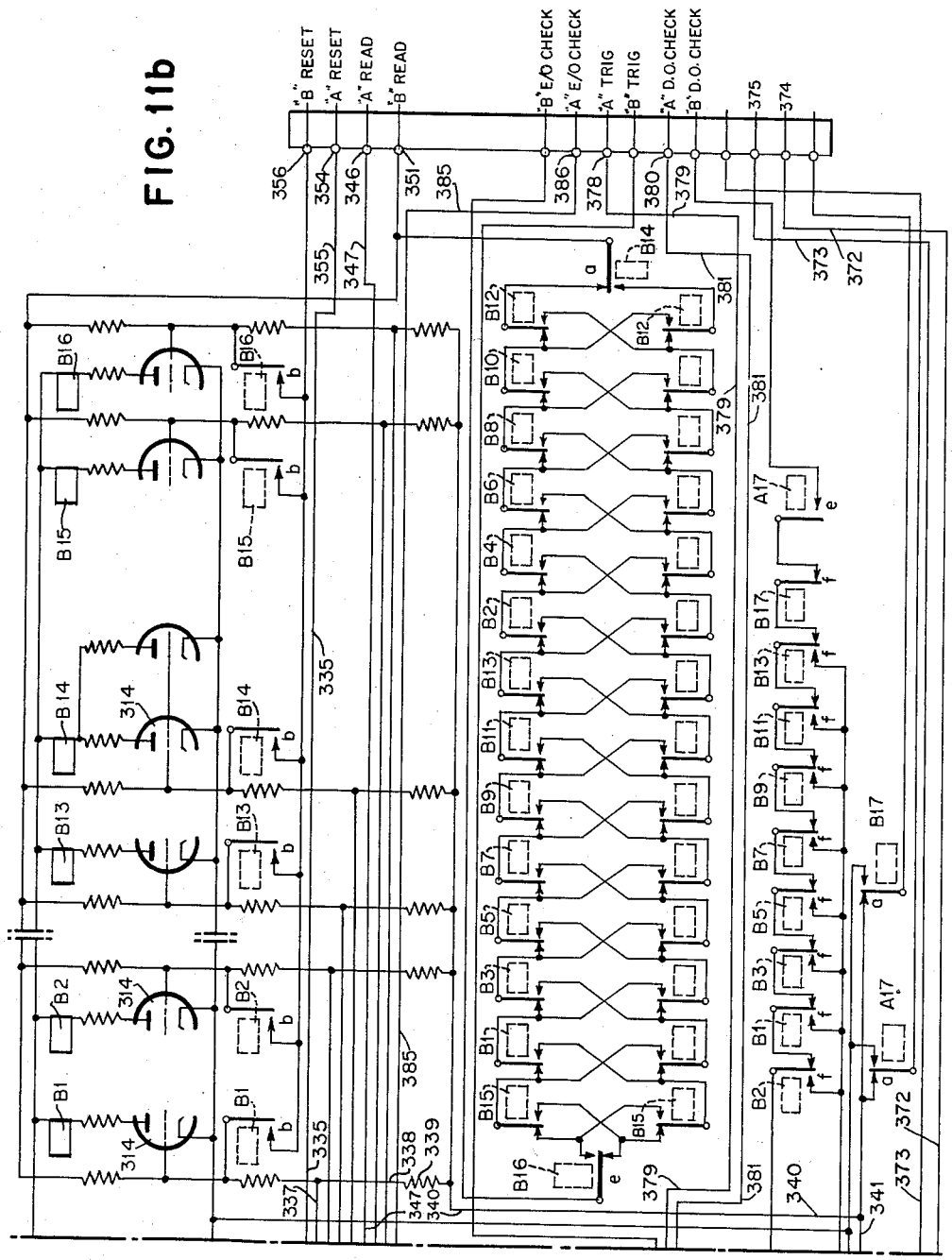

Jan. 12, 1960

R. TAYLOR ET AL 2,920,818

DYNAMIC EVALUATOR

Filed Dec. 31, 1954

"A" EXCITATION

"B" EXCITATION

INVENTORS
RICHARD TAYLOR
ROBERT N. STRAEHL
ANTHONY J. SANCHIRICO
BY
ATTORNEY

Jan. 12, 1960

R. TAYLOR ET AL 2,920,818

DYNAMIC EVALUATOR

Filed Dec. 31, 1954

INVENTORS
RICHARD TAYLOR
ROBERT N. STRAEHL
ANTHONY J. SANCHIRICO
BY
ATTORNEY

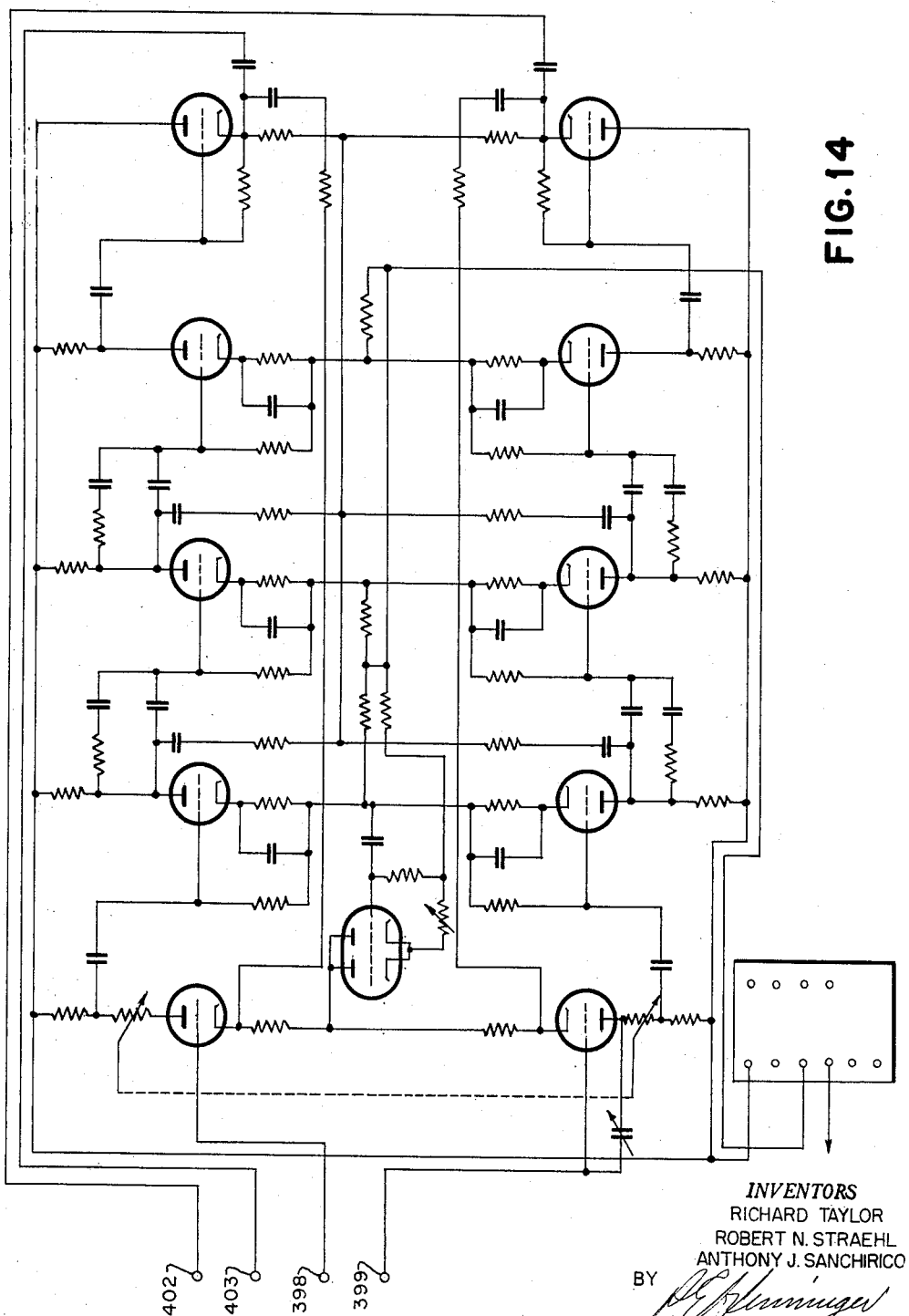

United States Patent Office 2,920,818
Patented Jan. 12, 1960

2,920,818

DYNAMIC EVALUATOR

Richard Taylor, Binghamton, Robert N. Straehl, Rochester, and Anthony J. Sanchirico, Johnson City, N.Y., assignors to International Business Machines Corporation, New York, N.Y., a corporation of New York Application December 31, 1954, Serial No. 479,104

17 Claims. (Cl. 235—61.7)

This invention is concerned with a quantitative evaluator. More specifically, an evaluator for checking the dynamic performance of an analogue computer, e.g. gunfire control equipment, missile control computers, bombing computers, etc.

Heretofore, there has been a need for dynamic testing devices to be used with computers such as a bombing computer, but efforts to produce successful equipment to fulfill this need have been up to now frustrated by the apparent large scale effort involved and more specially by the difficulty of attaining sufficient accuracy in the testing equipment. By means of a system according to this invention, which provides a dynamic performance analyzer, the realization of such dynamic testing means has been made practical. Briefly, the basic idea is to precalculate, by digital methods, instantaneous values for all important variables, which are stored in time sequence as punched holes on a continuous tape. The numerical values (which are represented on the tape in binary code) are then available precisely when they are needed for dynamic conversion to A.C. voltages. Voltages so established, to a predetermined accuracy, control the operation of the test computer and serve as standards for "on the fly" comparison with actual voltages. Any given number of variables can be established simultaneously; and a time history of the errors at predetermined points in the computer are recorded as a continuous graph ready for immediate analysis.

Consequently it is an object of this invention to provide a dynamic analyzer having sufficient accuracy to produce continuous evaluation of a computer to be analyzed.

Another object of this invention is to provide an analyzer, or evaluator, that will show the performance of a computer at any predetermined intermediate outputs so as to aid in the location of any malfunction.

Another object of this invention is to provide a means for aiding in the improvement of designing computers or the like, by giving an indication where unnecessarily strict tolerances may be relaxed without adversely affecting the final outputs of the computer. Conversely, there will be an indication where tolerances should be reduced in order to improve the accuracy of the computer.

Another object of this invention is to provide apparatus for exactly measuring any degradation of performance under adverse conditions. For example, with regard to a bombing computer, the computer will be subjected to high altitude where the equipment will encounter low pressure, low temperature, etc., when in actual use. But since such adverse conditions may be readily simulated by use of low pressure and temperature chambers, it will be appreciated that by using an evaluator according to this invention, any changes, especially adverse accuracy changes, may be detected in a dynamic manner as the computer is being operated.

Yet another object of this invention is the provision of means for speedily performing dynamic system tests of completed computers from the production line to determine whether or not a given computer assembly shall be acceptable; or, where permissible, as determined by dynamic tests with the evaluator on pilot models, to provide means for gathering data to establish criteria for static tests that can be used in lieu of dynamic tests to indicate accurate dynamic operation. Similarly, engineering techniques may be evaluated by use of this invention, so as to provide a check on (and thereby to make more exact) the use of mathematical error analysis with regard to overall probable error predictions.

Briefly, the invention involves a dynamic evaluator for continuously checking the performance of a computer that has an analogue output signal or a multiplicity of analogue output signals. Such evaluator comprises means for generating a variable input signal for said computer that has an accuracy better than the maximum accuracy of the computer output; also including means for generating an accurate predicted signal having an accuracy better than the maximum accuracy of the computer output; and in addition, having means for comparing said computer output signal with said predicted signal to produce a difference signal, the amplitude of which is proportional to the dynamic error of the computer output.

A specific embodiment of the invention is described in some detail below and illustrated in the drawings, in which:

Fig. 1 is a block diagram illustrating the complete system according to this invention;

Fig. 2 is a simplified circuit diagram of a digital-analogue converter, showing the switching circuits for producing half steps of signal change;

Fig. 6 is a timing diagram showing the relative timing of the various check pulses and the actuation of certain circuit elements;

Fig. 7 is a schematic diagram illustrating the basic elements of the control grid circuit for each relay that is controlled by the tape;

Figure 9A:
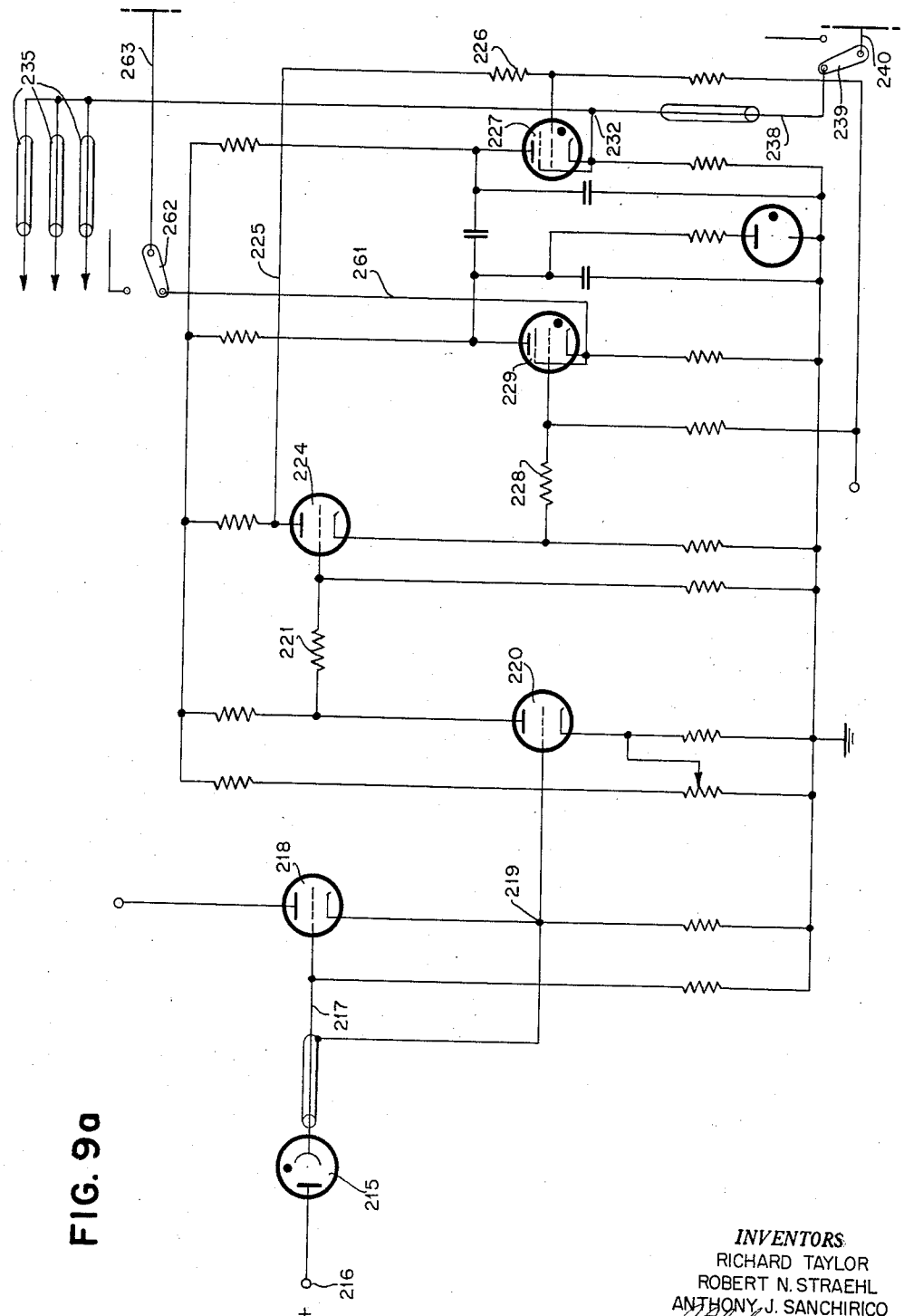
Figure 9B:
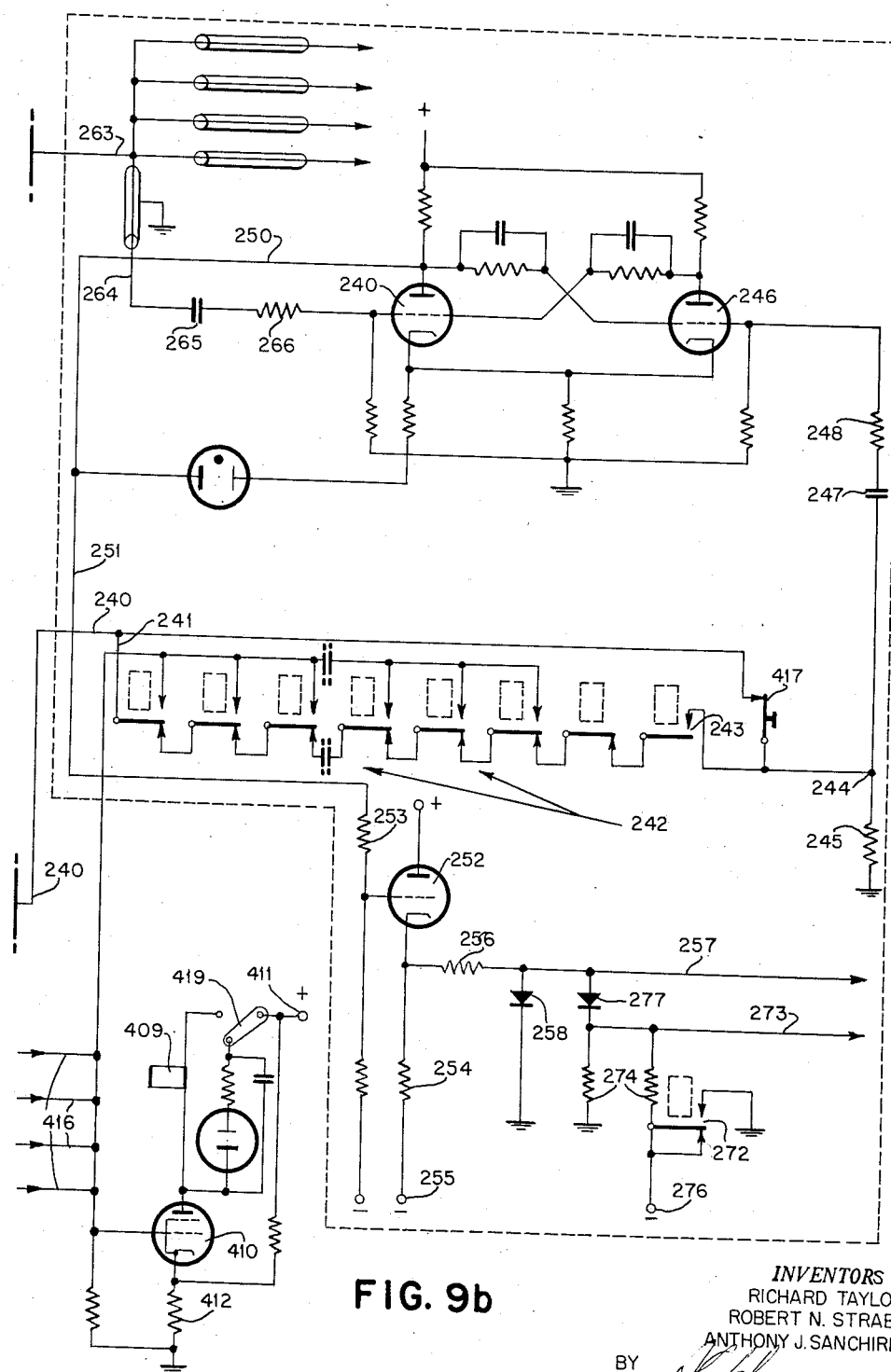
Figure 12A:
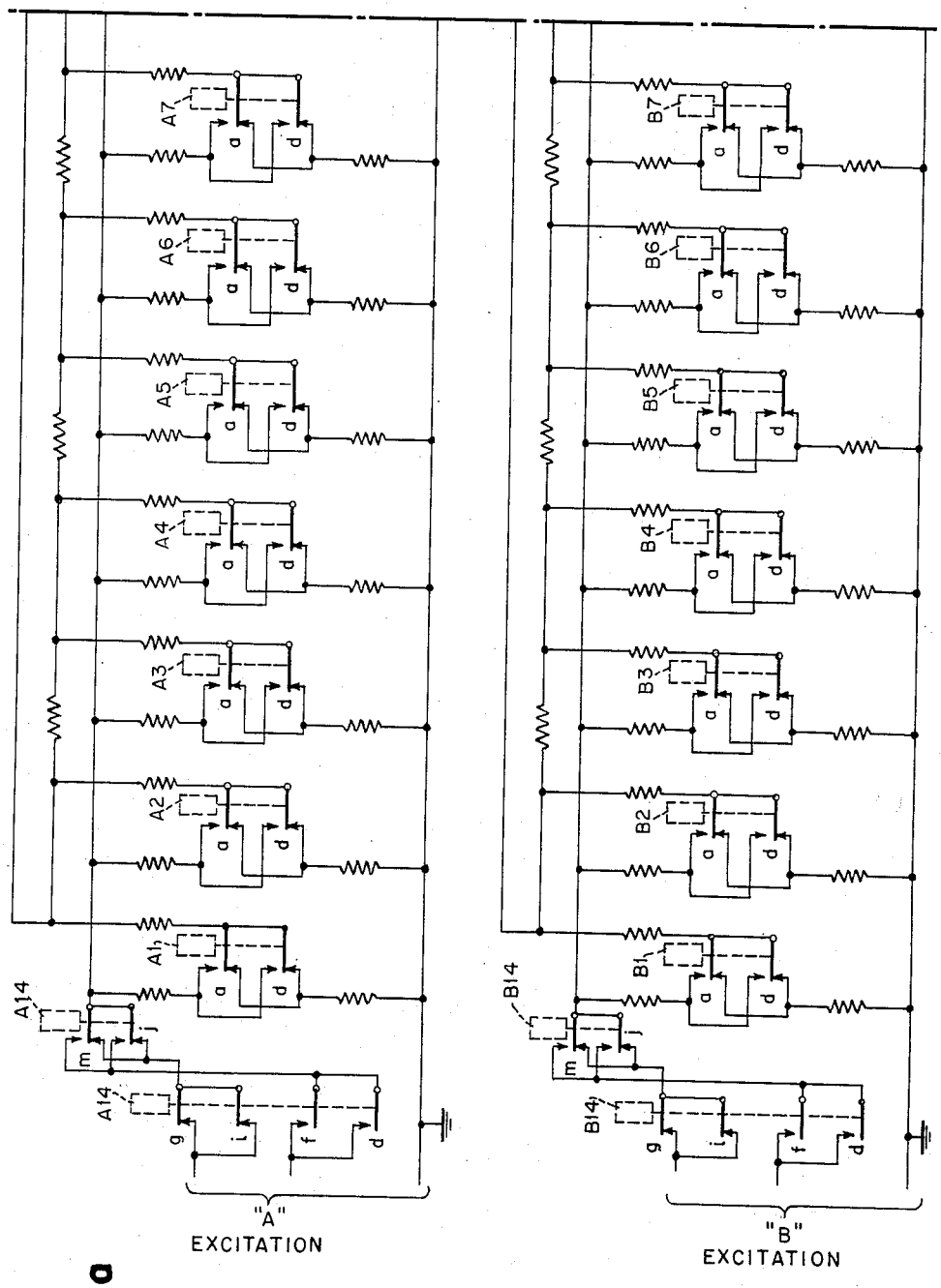
Figure 12B:
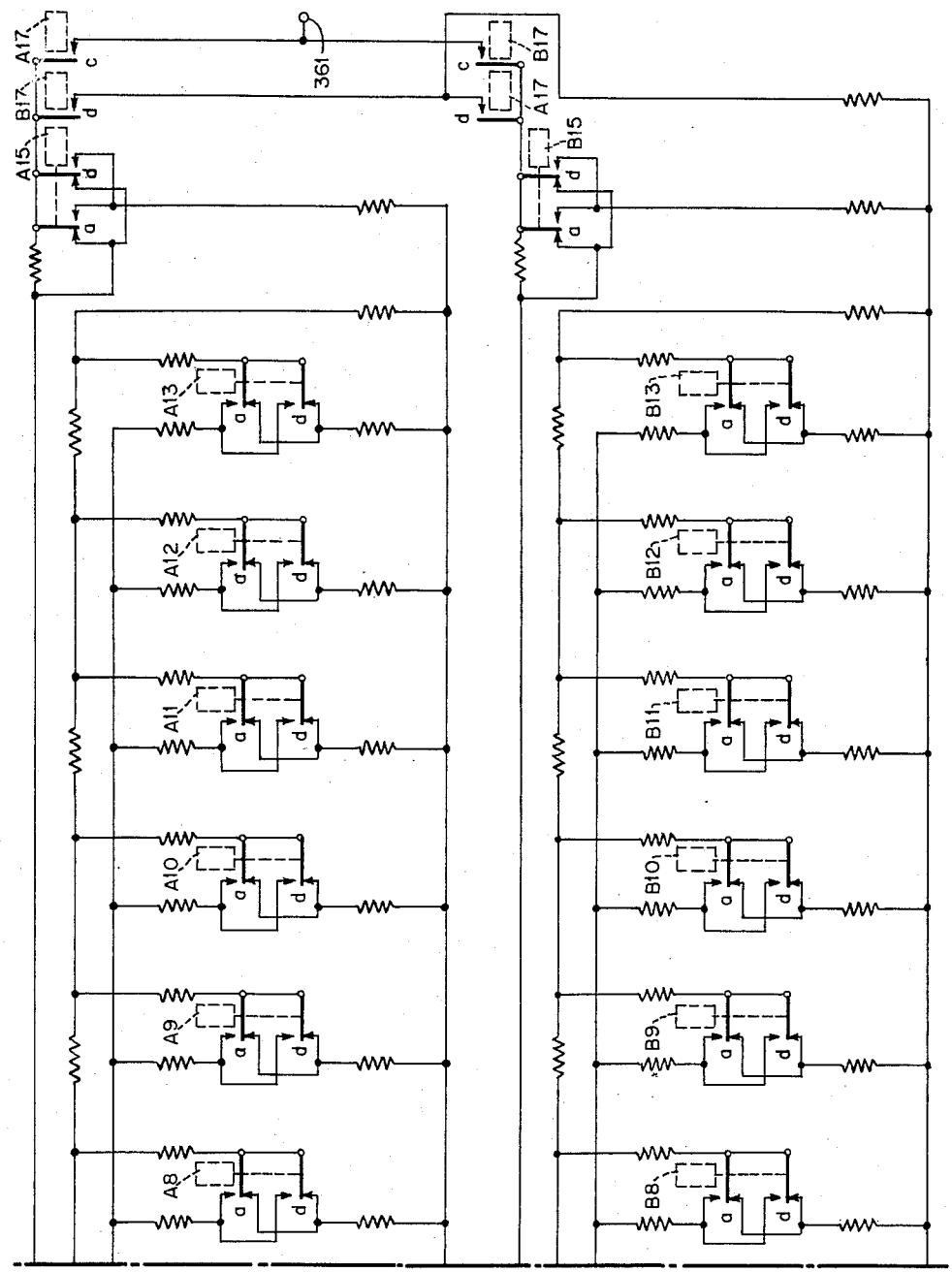
Figure 13:
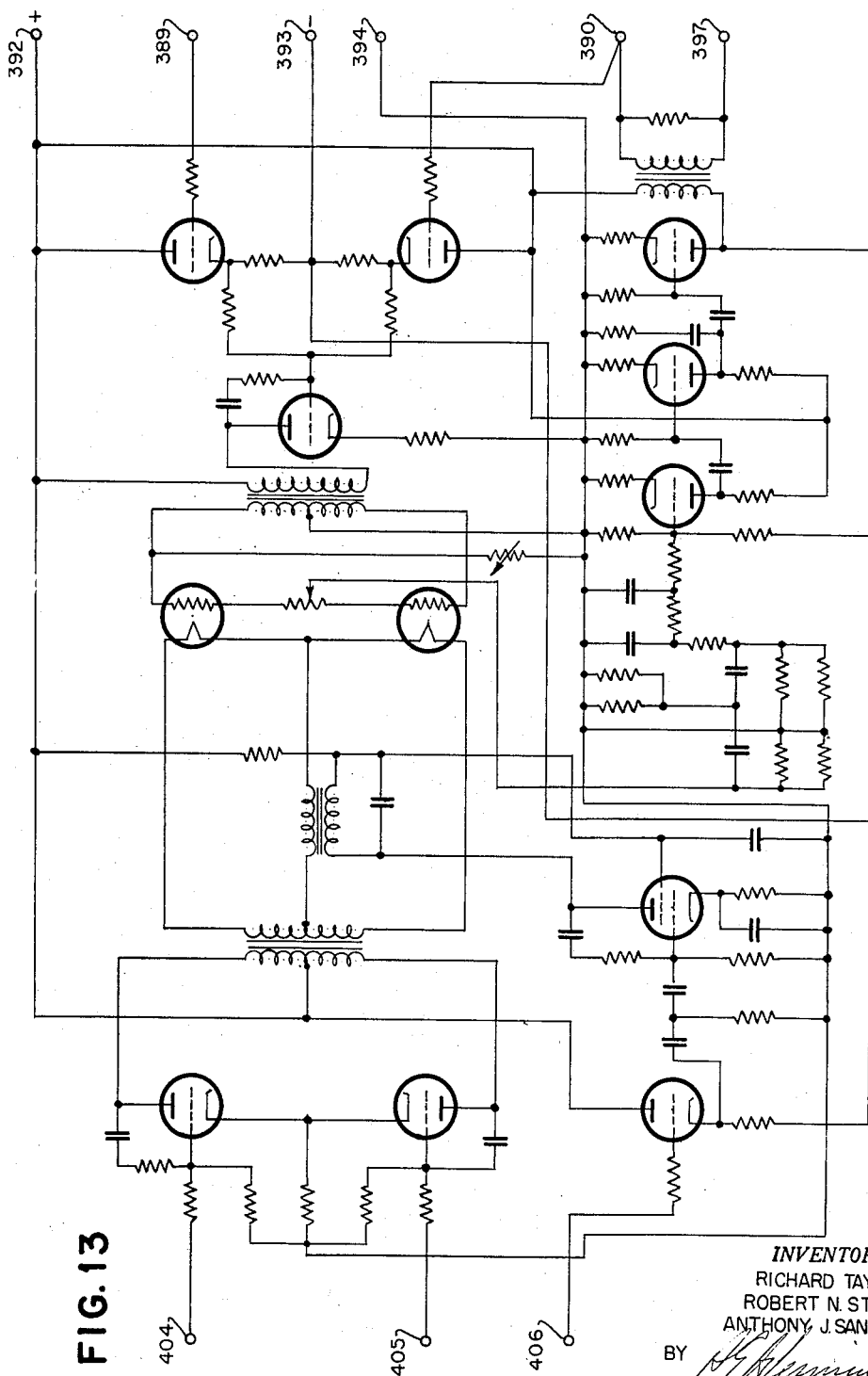

Figs. 9a and 9b together show a circuit diagram for a portion of the timing and pulse shaping circuits;

Fig. 10 is a detailed circuit diagram of the timing circuit for the transfer pulses;

Figs. 11a and 11b are a detailed circuit diagram showing the complete control and check circuits involved in one digital analogue converter;

Figs. 12a and 12b are a detailed circuit diagram showing the two voltage divider networks of one digital analogue converter;

Fig. 13 is a detailed circuit diagram of a phase correction network; and

Fig. 14 is a detailed circuit diagram of a balanced amplifier as employed in the system.

In general, the system includes elements that may be represented in block form as illustrated in Fig. 1. The technique involved in the evaluator system of this invention includes, among others, the step of setting up signals which are accurately predetermined. Such signals are the result of prior calculations so as to accurately determine two classes of signals employed in the system. One class of signals is that which represents the various input signals and which the computer being analyzed will receive in solving a given problem. The other class of signals is that which represents the predicted output signals and which the computer being evaluated should produce if it is operating without error, to the same degree of accuracy as the evaluator.

It will be observed that in the illustrated system there is shown a bombing computer 21 that is having its performance evaluated. The input signals, which computer 21 receives during its operation in solving a given problem, are represented by a line 22 having an arrow indicating the direction of flow of information into the computer. In order to properly analyze the computer operation such input signals must be of a higher degree of accuracy than the overall known accuracy of bombing computer 21. In order to accomplish such required accuracy of the input signals carried by line 22, there is employed a precision digital to analogue converter 23, that includes details to be more fully set forth below. The predetermining of the signals (which will be produced by the converter 23) is accomplished by means of information that is set up on a tape 25 that is included in a tape reader 24. The tape reader 24 employs a storage of information on tapes, e.g. the tape 25 as illustrated, which information is in binary code. This coded information is precalculated to a desired degree of accuracy and encoded in lines across the tape. Each line represents the information as of intervals of time forty milliseconds apart. Each tape controls the generation of a given single signal.

Another way of explaining the overall operation of the system according to this invention, is to point out that there is involved in the technique used, a setting up of accurately predetermined signals. Some of these signals represent the inputs to the computer, such as bombing computer 21; and may involve a simulated problem, so set up as to cover the complete range of operation of the computer. These signals are set up by using a digital to analogue technique, the details of which will be more fully described below. Such signals are precalculated and set up by means of a binary code punched into a tape, e.g. tape 25. It will be appreciated that there must be generated a separate signal for each separate computer input. Furthermore, whereas the block diagram of Fig. 1 merely illustrates one line 22 for input signals to the computer 21, this represents all of the various input signals involved.

The technique further involves a setting up, in the same manner, of different signals that represent computed predicted output signals. Referring to Fig. 1, it will be observed that the various signals, which are precalculated and set up in code on the tape 25, are transmitted to the converter 23 by means of circuit details to be explained. These circuit details are indicated in general by a line 26 that has the caption "Binary Coded Program."

In order to evaluate the performance of the computer 21, predicted output signals to be derived from the computer are precalculated and encoded on tapes in the tape reader 24. These signals after having been generated in the converter 23 are carried to an error detector 27 over the indicated line 28. Now, by feeding the computer output over a line 29 to the error detector 27, a direct comparison between the actual output signals from the computer 21 and the predicted signals which the computer 21 should be producing according to accurate precalculation may be had. The error or difference may be directly detected in the error detector 27 and followed visually by a display 27a, as well as being continuously recorded by means of a recorder 30, illustrated. In this manner the error may be instantaneously observed, while at the same time a permanent record is effected for later review.

In a system such as that illustrated in Fig. 1, the operation involves setting up signals which have a common time base, or definite correlation therebetween. Such correlation may be obtained in various ways which may be chosen for being best suited to a given evaluator. For example the illustrated system employs time signals that are directly related to the tape recorder by some means, such as employing a photocell arrangement in connection with a disc that is driven directly from the shaft which drives the tape 25. This arrangement is schematically illustrated at 35. It is pointed out that timing pulses are transmitted over a schematically illustrated line 36 to a timing pulse shaper 37. It will be appreciated upon a detailed disclosure of the specific elements involved in the evaluator, that the timing pulse shaper 37 is not a unitary element in the system but merely represents in block form a portion of the system for purposes of overall explanation.

When the computer that is being evaluated is a so-called bombing computer, such as that illustrated in the specific embodiment here being described, there is included in the operation of the computer a manually controlled variable correction signal. For example, a bombing computer when in actual operation employs a device whereby continuous corrections are manually introduced into the system for eliminating errors in the output of the computer, from whatever cause. Such manual correction is ordinarily accomplished by visual means, including manual operation, by employing manual controls in connection with the placing and maintaining of the cross hairs of the aircraft's periscope, directly on the desired target. Such action by a human operator introduces a correction signal that represents the difference between the location that the cross hairs would have assumed under the operation of the bombing computer uncorrected, and the position of the cross hairs as manually maintained on the desired target. In order to accomplish this action in a simulated manner, and for the purposes of evaluating the overall operation of the bombing computer, there must be employed an error detector and signal converter for closing the outer servo loop which accomplishes the function that the human operator performs in the actual operation. Such error detector and signal converter is indicated in Fig. 1 by means of a box 38 that is entitled "Simulated Operator."

In addition, a system for evaluating a bombing computer will include certain signals that are constant. Such signals must, however, be predetermined to the desired accuracy and an element indicated by a box 39 is provided in the system for generating such constant signals to be introduced to the bombing computer as indicated.

*Generation of high accuracy signals*

In order to generate the accurate signals that are necessary for the evaluator system, a digital-analogue technique is employed. In this manner a desired degree of accuracy determined in a digital manner may be provided, while an analogue signal is obtained for use in the system. In other words, it has been discovered that the necessary analogue input signals for testing any given computer as well as the analogue predicted signals (that are to be used as a standard of comparison for determining the accuracy in the output of the computer) are obtainable to any predetermined degree of accuracy (within reason), by means of a digital technique now to be described. The details of a digital analogue signal generator similar to that employed in this system are disclosed and claimed in United States Patent 2,813,987, granted November 19, 1957, on the application of Richard Taylor.

Figure 3:
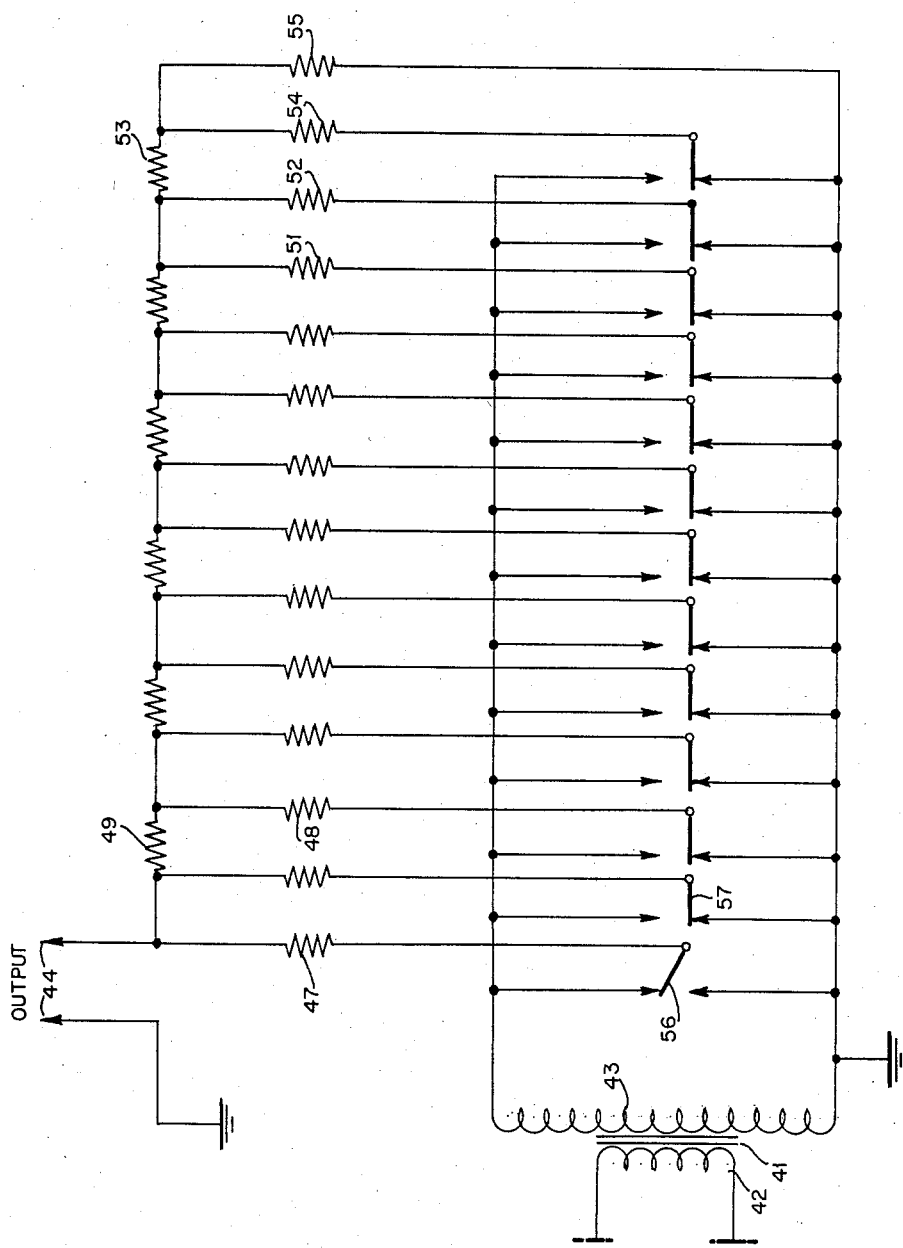
Fig. 3 is a simplified circuit diagram of a voltage divider network of a type employed in duplicate in each digital analogue converter.

Referring to Fig. 3, there is shown a simplified circuit to illustrate the fundamentals involved in the voltage divider network that is employed in the digital analogue technique. A transformer 41 has a primary winding 42 that will be connected to a constant source of A.C. supply. This transformer 41 must have good regulation since the impedance across its secondary winding 43 will vary quite widely. By means of the switches illustrated in connection with a network of resistors, the output voltage that will be produced at terminals 44 may be varied in steps of any desired size, being divisions of the input voltage which is developed across a secondary winding 43. For example, a network having thirteen switches is illustrated in Fig. 3. Thus, the output voltage may be varied from 1/8192 of the input voltage to 8191/8192 of the input voltage, in steps of 1/8192. It will be noted that this fraction of the exciting voltage is one step of a binary system having thirteen digits.

An example will clarify this explanation. First of all it is to be noted that by choosing a particular ratio for the various resistors of the network, a constant output impedance may be maintained. This ratio also renders the division of the voltage in a binary manner more simple to explain. It will be noted that beginning at the left hand end of the network as viewed in Fig. 3, there is a resistor 47 that is related to the resistor 48 alongside thereof, in the ratio of two to four. Considering the resistors in groups of three, a third resistor 49 is related to the resistors 47 and 48, as three is related to two and four. Therefore, each group of three resistors along the network that correspond to resistors 47, 48 and 49, have resistance values which are equal for each of the corresponding resistors and which are related to one another in each group in the ratio of two, four and three, respectively. This relationship holds true along the network including the last group of three resistors, i.e. resistors 51, 52 and 53, which are followed by a final resistor 54 that has the same value as resistors 51 and 47. Then there is a resistor 55 that also has a resistance value equal to resistors 54, 51 and 47.

As an example of the output voltages that are obtainable by combinations in the switching of the voltage divider network, it is pointed out that with a switch 56 in its upper position as illustrated, the network of resistors are connected across secondary winding 43 with resistor 47 in series therewith. It is pointed out that by a simple carrying forward of the network resistance beginning at the right hand end (with the resistor 55 in parallel with resistor 54) and working over to the other end of the network (just short of resistor 47), the resistance value of the network will be found to be equal to the resistance of resistor 47. Consequently the output voltage will be one half of the excitation voltage received from secondary winding 43. In like manner, it will be clear to one skilled in the art that by switching 56 back to its lower position and raising the next switch 57 to its upper position, the voltage divider network will then be such that the voltage produced is one quarter of the excitation voltage. Thus, the reduction of voltage obtained by individually switching each of the thirteen switches illustrated will be a reduction by one half from the preceding voltage in a binary manner so that the voltages thus obtained are ½, ¼, ⅛, ⅟₁₆, etc., down to ⅟₈₁₉₂. Therefore, by permutating the switches for the network in various combinations, any subdivision of the excitation voltage from secondary winding 43 may be obtained. The voltage outputs of the illustrated network can be verified by mathematical analysis. However, such analysis is quite complicated and does not aid in the understanding of this invention.

Referring to Fig. 2, it is to be noted that in producing the accurate voltages for use in the evaluator system, it has been found desirable to employ a pair of voltage divider networks like that illustrated in the simplified circuit of Fig. 3 and described above. The two voltage divider networks are designated "A" and "B" in Fig. 2, and will be referred to in this manner throughout this description. By using two such networks and switching in a manner to be described, the output voltage may be varied in half steps, from a given voltage as set up on one of the networks, e.g. network "A" to the next succeeding voltage that is set up on the other network, e.g. network "B." There is a separate transformer 61 for voltage divider network "A" and a similar transformer 62 for voltage divider network "B." As indicated, these transformers 61 and 62 may be energized in common from a constant source which is the same source supplying the test computer that is applied to terminals 63. It will be noted that there is a center-tapped secondary winding 64 and 65 respectively for each of the transformers 61 and 62. In this manner the excitation voltage as applied to the voltage divider network of each network "A" and "B" may be reversed in phase or sense to produce a signal voltage that is reversible in sign. There are relays 66 for actuating the switches in each of the networks. Also, in order to guard against a short circuit across the secondary windings 64, 65, there are additional resistors 67 in each of the networks. These resistors 67 are omitted near the end of the network since a resistor 68 in series with the common connection at this point may act as adequate protection while introducing only a negligible error. Since each of the two networks "A" and "B" is an identical circuit entity, all explanations that refer to one apply equally well to both. The output signal from the combination of both networks is carried over a wire 69 to the desired output circuit as indicated by an arrow. Wire 69 may be effectively switched from the output of network "A" to the output of network "B" and back again, with the switching accomplished in a manner to provide a combined, or average, output of networks "A" and "B" together, as an intermediate condition between the conditions of network "A" alone and network "B" alone, being connected to the output wire 69.

Such switching is accomplished by employing a dummy load resistor 71 that is connected across the output of each network "A" and "B" in turn, while the other network is connected to output wire 69 by itself. Also, the dummy load resistor 71 is connected across both voltage divider networks in common, when they are both connected to the output 69 at once. By this means the combined voltages derived from the networks "A" and "B" are averaged, when they are both connected to output wire 69 at once, and no undesired build-up of voltage is experienced. It will be noted that the output circuit for network "A" includes a switch 72 that bypasses a resistor 73 which is used to introduce a scale factor change when desired. The output circuit for network "A" may be traced from a point 74 via the switch 72 and a wire 75, another wire 76 to a switch 77 and then via a wire 78, to wire 69. When a switch 81 is closed the output circuit of network "A" will be carried from the wire 75 via a wire 82 and another wire 83, to the dummy load resistor 71. Now, it will be evident that by proper switching of the switches 77 and 81 of the network "A," as well as the corresponding switches 84 and 85 for network "B," the half step conditions described above may be readily obtained. Details of the control circuits for the relays that operate these switches will be more fully described below.

It will be noted that the resistance value of the dummy load resistor 71 is made equal to the input impedance of the load supplied by each voltage divider network "A" and "B" via wire 69 in Fig. 2, so as to eliminate switching transients. It will be further noted that low contact resistance is provided at the switching points for the purpose of maintaining high accuracy.

Two-wire three-wire signal converter

In a bombing computer, certain input signals are of such a nature that they are introduced over a three-wire circuit. For example, the computer uses inputs to a rotary machine of the type known generally as a "synchro." Such a machine has Y-connected windings that receive signals therefor over three wires as is usual for this type of machine. In such a synchro machine the output is employed to determine a shaft position in rotation and the signals which are received over the three wire circuit have a definite relationship to one another which may be expressed in terms of functions of the shaft angle. It has been discovered that by the use of a circuit such as that illustrated in Fig. 4, the three wire signals for a synchro input may be generated from a two wire circuit that carries signals having a predetermined relationship over such two wires. By this means, one input circuit may be eliminated in the evaluator system. Such signal elimination produces a real economy in the evaluator system, as will be readily appreciated when the complexity of a single signal digital-analogue converter, as described above, is contemplated.

Figure 4:
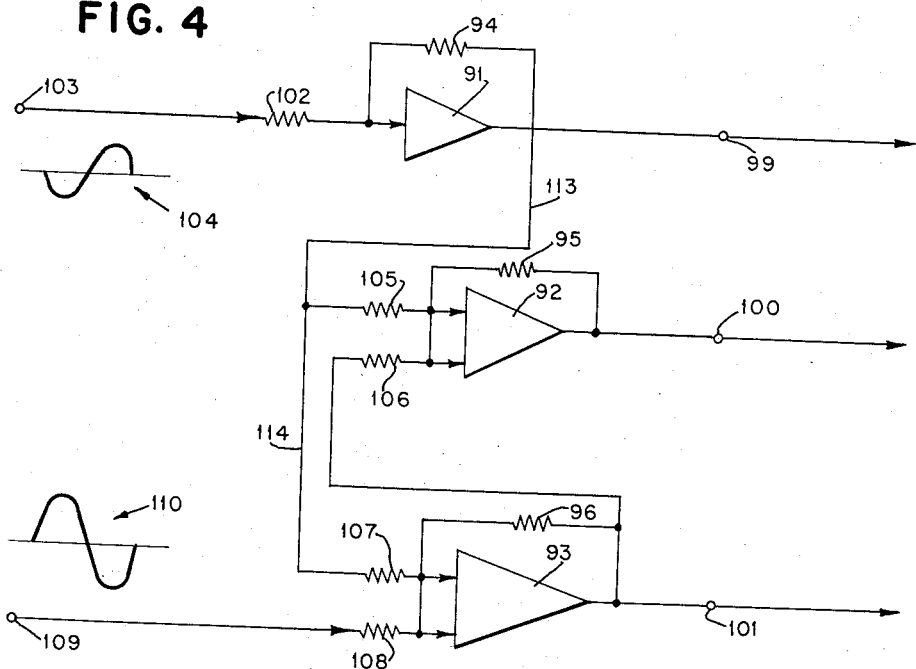
Fig. 4 is a schematic circuit diagram, illustrating a technique for employing a conversion from signals on two wires to related signals on three wires.

A two-wire to three-wire conversion circuit is shown in Fig. 4. It will be observed that there are three isolation amplifiers 91, 92 and 93. Each of these amplifiers may be of a conventional type and consequently are only shown in block form. There is illustrated, however, the feedback circuit in each case, which includes resistors 94, 95 and 96, respectively. Such feedback resistors as well as input resistors are illustrated outside of the block indication for each amplifier to describe the computing functions obtained by this configuration of isolation amplifiers and resistor networks.

As indicated, each amplifier 91, 92 and 93 may be a satisfactory conventional amplifier which produces a reversal in phase of the amplified signal. For example, reference is made to a summing amplifier that is disclosed in a Swartzel Patent No. 2,401,779 issued June 11, 1946. By employing the circuit illustrated in Fig. 4, there are three output terminals 99, 100 and 101. These terminals are termed "output" in Fig. 4 only since they are inputs to the computer, e.g. computer 21 of Fig. 1. In order to obtain the desired synchro relationship between signals to be applied to terminals 99, 100 and 101, as described above, the signals must have the following relative values: The signal at terminal 99 should be proportional to $K \sin \theta$, where K is a scale factor constant and $\sin \theta$ is a given numerical value related to the angle $\theta$ of the synchro shaft involved. Similarly, the signal at terminal 100 should correspond to the expression "$-K/2 \sin \theta + \sqrt{3}/2K \cos \theta$" and at terminal 101 the signal should correspond to a value that is expressed by "$-K/2 \sin \theta - \sqrt{3}/2K \cos \theta$." In order to obtain the relationship among the three signals at these terminals the isolation and summing amplifiers 91, 92 and 93 are connected as shown and include resistors for controlling the relative amplitudes of the various signals. For example, a resistor 102 is connected in the input circuit for amplifier 91 for controlling attenuation of the input signal that is introduced by means of a digital-analogue converter, such as that described above, at a terminal 103. The resistance value of resistor 102 is related to resistor 94 such that the amplitude of input signal as introduced at the terminal 103, and indicated by a wave form sketch 104, will have a relative amplitude corresponding to unity when it passes through the amplifier and is observed at the output terminal 99. Amplifier 92 has resistors 105 and 106 in each of its two input circuits and their ohmic resistance values will be like resistor 102 so as to produce a relative amplitude of unity for the signal transmitted. Amplifier 93 has a pair of resistors 107 and 108 in its two input circuits and the ohmic resistance values of these resistors will be so as to produce a relative amplitude of the signal transmitted, of one half in the case of resistor 107, and of $\sqrt{3}/2$ for resistor 108. Now it will be appreciated that by introducing a signal at the terminal 103 which corresponds to the expression "$-K \sin \theta$" (which may be physically illustrated as the wave indicated in the waveform sketch 104), and a signal may be introduced at another input terminal 109 that has a value corresponding to the expression "$+K \cos \theta$" (which may be illustrated by the waveform sketch shown at 110). By introducing signals having this relationship at terminals 103 and 109, signals will be produced at terminals 99, 100 and 101 having the desired relationship given above. This fact may be readily determined by following the circuit in the following manner: The signal at terminal 103 expressed as "$-K \sin \theta$" has its amplitude maintained at unity in passing through resistor 102, and since amplifier 91 has an odd number of stages, or otherwise reverses the phase of the signal, a signal is delivered at terminal 99 which will correspond to the expression "$K \sin \theta$."

At the same time the output signal from amplifier 91 is carried over a wire 113 and a wire 114 to the resistor 107 which introduces an amplitude factor of one half in feeding the signal through the amplifier 93. Consequently, a signal that corresponds to the expression "$-1/2K \sin \theta$" is introduced through the amplifier 93. Also, at the same time the input signal at terminal 109 is attenuated by a factor of $\sqrt{3}/2$ in passing through resistor 108, and amplifier 93 and therefore the other input to amplifier 93 arrives at the output as "$\sqrt{3}/2K \cos \theta$." Here again amplifier 93 reverses the phase or sign of the signals passing therethrough, and consequently the output signal at terminal 101 may be expressed in the form "$-1/2K \sin \theta - \sqrt{3}/2K \cos \theta$." It will be noted that this signal agrees with the desired signal at terminal 101, as did the signal produced at terminal 99.

Finally, the signal at terminal 100 is obtained by the combination of inputs to amplifier 92 in connection with its unity factor input resistors 105 and 106, in the following manner: Output signal of amplifier 93 ("$-1/2K \sin \theta - \sqrt{3}/2K \cos \theta$) is fed in via resistor 106 while the output from amplifier 91, i.e. "$+K \sin \theta$," is fed in by resistor 105. The summation or output of amplifier 92 (that includes the phase reversal as with amplifiers 91 and 93) may be expressed as "$-K/2 \sin \theta + \sqrt{3}/2K \cos \theta$." It will be noted that this signal agrees with the desired signal at terminal 100.

It is pointed out that by making use of a two-wire to three-wire converter circuit like that just described above, only two digital-analogue converters with a tape programmed signal for each, are necessary for creating three of the input signals to the computer 21 (Fig. 1), i.e. those representing the three-wire input to one of the synchros in the bombing computer.

*Error detector circuit*

As described generally above, with regard to the whole evaluator system, there is an error detector employed to determine the amplitude and sense of the difference between a given output signal from the computer, and the predicted value of such output signal as determined accurately by computation. It is pointed out that in order to accomplish this a predicted signal must be generated. Such predicted signal must have an accuracy that exceeds the overall accuracy of the computer being evaluated. This is accomplished by employing a digital-analogue converter of the type described above, the output signal of which is predetermined by the program controlling the same, to produce a predicted signal that is instantaneously representative of the accurate output signal from the computer that should be obtained if the computer is without error. Such predicted signal is continuously compared with the actual computer output signal by means of a circuit that is illustrated, partially in block form, in Fig. 5. Some of the details of this circuit will be more fully set forth below. As shown, there is a pair of terminals 118 and 119 that are captioned "Programmed Voltage" and "Unknown Voltage" respectively.

It will be noted that the programmed voltage input terminal 118 will have the predicted signal described above, introduced thereat, while the unknown voltage terminal 119 will have the computer output signal applied thereto. There is an attenuator and calibration network 120 illustrated by a box. The details of the network 120 are not material to this invention, and may be supplied by one skilled in the art. Any conventional circuitry for obtaining the desired attenuation and calibration effects may be employed. The predicted voltage as adjusted by the the network 120 is then fed over a wire 121 and a wire 122 to a balanced amplifier 123. It is to be noted that no attenuation will take place when the maximum sensitivity of error detection is desired.

Figure 5:
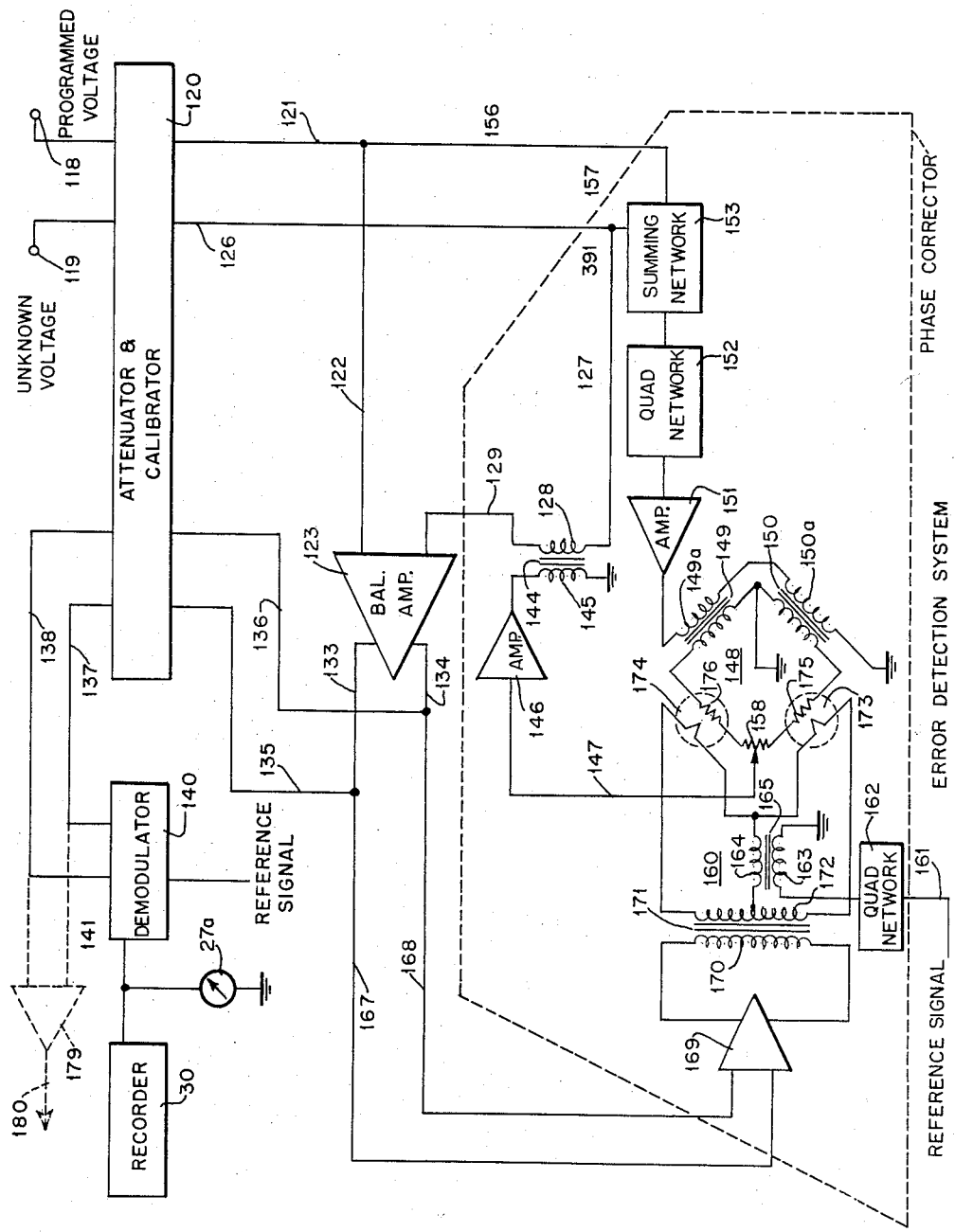
Fig. 5 is a schematic circuit diagram for a single error detector circuit, there being one such circuit for each computer output signal evaluated.

The computer signal introduced at terminal 119, after passing through the attenuator and calibration network 120, is fed over a wire 126 and another wire 127 to a transformer winding 128 and then via a wire 129 to the other input to the balanced amplifier 123. Difference signals are fed from the balanced amplifier 123 over wires 133 and 134 to wires 135 and 136, respectively, which feed the difference signal via another section of the attenuator network 120 and via wires 137 and 138 to a demodulator 140 where the comparison or difference signal is demodulated and fed via a wire 141 to the recorder 30, and the visual display element 27a. The visual display element may be a D.C. volt meter, or the like, as indicated in Fig. 5. It will be noted that the demodulator 140 is a well-known device for transforming an A.C. signal to D.C., and any conventional demodulator having the necessary circuit constants may be employed in the error detector circuit of this invention.

In order to avoid erroneous output signal readings from the signal comparison circuit just described above, it is necessary to make adjustments in order to insure that the computer output voltage, as introduced at terminal 119, is exactly in phase with the predicted voltage with which it is being compared. To accomplish this, the elements now to be described are employed. The transformer winding 128 is an element for introducing corrections as necessary to adjust the phase of the computer signal before it is fed into the input of the balanced amplifier. The superposing of signals in the winding 128 for effecting such adjustment is accomplished by the use of a transformer 144 having another winding 145 inductively related to the winding 128. Signals are fed through the winding 145 from an amplifier 146 that receives its input signals via a wire 147, which carries the output signal from a bridge 148, which in turn receives its input or excitation from a pair of transformers 149 and 150. The input or excitation signal to the bridge 148 is introduced via primary windings 149a and 150a, respectively, of transformers 149 and 150. Windings 149a and 150a are connected in series and carry the output signals from an amplifier 151, which is fed from a quadrature network 152, which in turn is fed from a summing network 153. The inputs to the summing network 153 are the two signals being compared, i.e. the predicted signal from terminal 118, over wire 121 and a wire 156 to the summing network 153; while the computer signal from terminal 119 is fed via the wire 126 and a wire 157, to the summing network 153.

Thus, the quadrature component of a combined or summation signal of the two signals being compared (without any correction of the phase of the unknown voltage) is fed, as the excitation signal, to the bridge 148. And, whenever the bridge 148 is unbalanced, an output signal from the bridge 148 will be fed over the wire 147 to the amplifier 146 and through the transformer winding 145 so as to superimpose a correction (by means of transformer winding 128) upon the unknown computer signal from terminal 119, to adjust the phase thereof as required. It will be noted that there is a potentiometer 158 in the bridge circuit for the purpose of making initial zero balance adjustments in the bridge.

In order to determine when a phase correction is necessary for the computer signal, there is a closed loop circuit that includes another bridge 160. The bridge 160 has fed across one of its diagonals a quadrature reference signal that is obtained from a reference signal introduced as indicated, over a wire 161. In order to detect any quadrature component in the combined computer and predicted signals, the reference signal is shifted in phase by ninety electrical degrees by a quadrature network 162, from which it is fed over the illustrated circuit through a primary winding 163 of a transformer 165. A secondary winding 164 of the transformer 165 is connected across a diagonal of the bridge 160 as illustrated. The quadrature networks 152 and 162 are well known elements for shifting the phase of a signal passing therethrough, ninety electrical degrees. Specific networks that may be employed in the circuit are illustrated in Fig. 13. It is to be noted that the reference signal is derived from the constant frequency source employed in generating the predicted signals, so that the predicted signals are exactly in phase therewith.

The other input to the bridge 160 is a signal obtained from the output of the balanced amplifier 123 and fed over the wires 133 and 134 to wires 167 and 168, respectively, which lead to an amplifier 169. The output of amplifier 169 is fed to a primary winding 170 of a transformer 171. The secondary of the transformer 171 has a center-tapped winding 172, the two halves of which constitute two of the legs of the bridge 160. The other two legs of the bridge 160 are constituted by the heating elements of a pair of thermal devices 173 and 174. It will be noted that the thermal devices 173 and 174 have thermally varied resistance elements 175 and 176, respectively. These thermally varied resistance elements constitute two of the legs of the bridge 148. One type of thermal element which may be employed is that known as a "thermistor" in the trade.

The operation of the phase correction aspect of this error detection system involves a feedback loop that creates the necessary phase adjustment by reason of any out-of-phase condition present in the computer signal as introduced at the terminal 119. This correction effect may be traced by following the combined signals that are being compared. First, the individual signals are fed into the balanced amplifier 123, the unknown computer signal going via transformer winding 128. Next, it will be noted that the combined summation signal of these two signals is fed into the summing network 153 and through the quadrature network 152, in order to produce a quadrature excitation signal into the bridge 148 that is derived from the summation signal of the unknown computer voltage and the predicted voltage before any correction is applied to the unknown computer voltage phase. Now, whenever the unknown computer signal is out of phase with the reference signal, a quadrature component will be present in the difference or output signal from the balanced amplifier 123. Therefore this difference signal which is fed into the bridge 160 via the amplifier 169 and the illustrated circuit, will cause the bridge 160 to be unbalanced. This is because any quadrature component in the difference signal, as fed via winding 170 of transformer 171 to winding 172, will create an unbalanced condition in the bridge 160 by adding to the quadrature reference signal flowing through one half of the bridge 160, while subtracting from the same quadrature reference signal flowing through the other half of the bridge, the bridge 160 being energized by the diagonally connected transformer having secondary winding 164.

Consequently, such unbalance will create unequal heating effects on the thermal elements 173 and 174, which in turn will vary the resistance of thermal resistances 175 and 176 so that they are unequal and thus the bridge 148 will be unbalanced. When the bridge 148 is unbalanced, it will produce an output signal that is fed via the wire 147 and the amplifier 146, to the winding 145 of the transformer 144. In this manner a correction signal is superimposed upon the unknown computer output signal (in winding 128 of the transformer 144) which will adjust the phase thereof to match the reference and consequently the phase of the predicted signal as well. In this manner the out-of-phase condition of the unknown computer output signal will be employed so as to constantly bring this signal into phase with the predicted signal, for an accurate comparison therewith.

It will be appreciated that the error detector circuit described herein may have utility apart from the whole evaluator system of this application. For this reason this portion of the invention forms the subject matter of another application that will claim this circuit per se. Such application may be identified as the application of Richard Taylor, Serial No. 478,441, filed December 29, 1954, now Patent No. 2,886,706.

*Simulated operator circuit*

As explained above in connection with the evaluator system illustrated in Fig. 1, with a bombing computer there is the need to provide a closed servo loop, for introducing a correction signal to bring the desired output to its proper value. This function is accomplished when the bombing computer is in actual operation by a manually controlled insertion of a correction signal. To accomplish this function for the purposes of an evaluator according to this invention, it is necessary to provide a comparison and correction loop. This is accomplished by employing a circuit that is identical with a single error detection circuit such as that described above in connection with Fig. 5; but having at the output end thereof an isolation amplifier 179, that is illustrated in dotted lines in Fig. 5. It is to be noted that the demodulator 140 and recorder 30, as well as the visual display element 27a, are superfluous when this circuit is employed as a simulated operator. Therefore these elements will be omitted in this case. In other words, the system as illustrated in Fig. 5 is entirely the same except for the change created by omitting the demodulator 140, recorder 30, visual indicator 27a, and replacing them with an isolation amplifier 179 which feeds its output signal via a wire 180 back into the bombing computer 21. This change is for introducing the necessary correction signals that are, in actual operation of the bombing computer, manually controlled as described above.

Another way of explaining this element of the evaluator system is to point out that, with reference to Fig. 1, the simulated operator 38 is in detail a circuit like the error detection system illustrated in Fig. 5. However, the dotted line elements 179 and 180 are employed in place of the recorder 30 and demodulator 140 of that error detection system. Therefore the terminals 118 and 119 are equivalent to the signal input paths illustrated by wires 183 and 184 in Fig. 1 respectively, while the output signal (as fed out on the dotted line wire 180 of Fig. 5) corresponds to the signal path from the simulated operator 38 over a wire 185 shown in Fig. 1. It will be noted that in terms of function, it is cross and parallel components of the "computed range to target" that are manually corrected in actual operation. Consequently, in the evaluator, cross and parallel components of the "computed range to target" signals are compared with the predicted signal representing cross and parallel components of "true range" and the necessary correction is represented by the respective differences, which are the outputs of the simulated operator 38. Only one line is used to represent both the cross and parallel components since both components are introduced in exactly the same manner.

*Timing controls for check circuits*

It was indicated above that the operation of a digital-analogue converter to produce a predetermined signal or series of signals, is under the control of a tape, such as tape 25 (Fig. 1) and certain timing signal elements 35 of the tape reader 24. Fig. 6 is a timing diagram which indicates the interrelation of the various control actions which take place in a given digital-analogue converter, over a period covering a plurality of cycles. The diagram has horizontal divisions which represent the time, and each division represents five milliseconds. The first five lines of the diagram show the action of elements located in the tape reader 24 and include the brushes as well as timed "read" and "transfer" pulses which are explained fully below. On the next six lines below this, there are the various check pulses which will be explained in greater detail below. On the next three lines there is an indication of starting conditions, after which comes a group of lines showing the timing of the coil energization for certain of the relay coils, as indicated. Finally, the bottom line of the diagram illustrates the duration of each output signal and its transition from each one to the following signal, which takes place in half steps as mentioned above.

Figure 8:
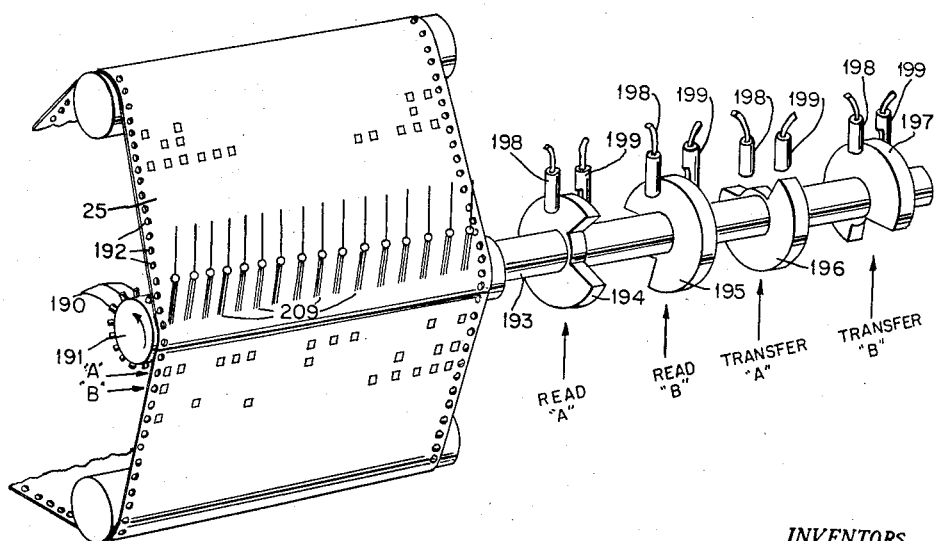
Fig. 8 is a schematic perspective view illustrating an example of the physical relationship between the tape and the timing discs.

The timing of the system is basically controlled by employing a tuning fork as a frequency source although other means for obtaining a standard constant frequency might be employed if the accuracy thereof were sufficiently high. In the system of this invention there is employed a synchronous motor which drives the tapes as well as four timing discs or the like for producing timing pulses to be employed in the system. The physical relationship between the tapes and timing discs is illustrated in Fig. 8, where it is schematically shown that the tape 25 is driven by means of a sprocket shaft 191 which drives a sprocket located at each edge of the tape 25. Each sprocket has pins 190 around the periphery thereof for engaging a series of feed holes 192 along each edge of the tape 25. Directly connected to the sprocket shaft 191 through appropriate gearing (not shown), for being driven therewith, there is a shaft 193 that has four discs 194, 195, 196 and 197 securely attached thereto for rotation therewith. As indicated above, the tape drive, i.e. sprocket shaft 191, is driven by a synchronous motor not shown) that is energized from a constant frequency source maintained by some accurate means, e.g. a tuning fork. Consequently, because of the direct mechanical drive, e.g. using gears, the discs 194-197 are maintained at an accurate constant speed also. As indicated in the drawing of Fig. 8, two of the discs, i.e. 194 and 195, will, respectively, produce group "A" and group "B" timing pulses for reading a given signal from the tape into a digital-analogue converter, in a manner such as described above. The other two discs, i.e. 196 and 197, produce timing pulses to be employed in actuating transfer relays to control the switching that is necessary for producing an output signal, from each digital-analogue converter, that varies in a step-by-step manner with the variation being in half steps, as previously described. It will be noted that in connection with each disc 194-197 there is a shielded light source 198 and a phototube 199 located directly opposite the light source 198 for receiving light therefrom, when passage of such light is permitted by the disc associated therewith. It will be appreciated that the discs 194-197 may be constructed in various manners to accomplish their purpose. They are illustrated as being constructed of opaque material and having open pie-shaped notches, having a predetermined angular size for producing in the phototube 199 a pulse of given duration in each revolution of the shaft 193, and the discs 194-197. It will be appreciated that instead of having notches in opaque discs as illustrated, each disc might be constructed of a thin transparent material having an opaque coating thereon for that portion corresponding to the solid parts of the opaque material discs illustrated.

In connection with the timing, it is pointed out that in the operation of each digital-analogue converter there is a series of relay actuated switches for determining the setting of the voltage divider, which produces the output signal that is to be used as a signal having predetermined accurate amplitude. For controlling each of such relays, there is an electronic tube 202 (Fig. 7) that includes in its plate circuit a relay 203 and a plate resistor 204. The diagram of Fig. 7 is a simplified schematic, indicating the control circuits for each tape controlled relay in the digital-analogue converters. Energization of the relay 203 is under control of the grid circuit for the tube 202 which must have simultaneous pulses from two separate circuits, one being the read bus circuit illustrated, that has a resistor 205 in series therewith; and the other being the brush circuit that includes a terminal 206 having a negative voltage, e.g. −50 volts connected thereto, and two series resistors 207 and 208. The brush pulses are produced in this circuit under control of the tape 25, as illustrated, and flow by way of a brush 209 whenever it completes a circuit to the drum 210 thereunder, which drum, in turn, is connected to ground, as shown. Therefore, a brush pulse from this circuit is produced whenever a hole or slot in the tape 25 passes under the brush 209. The circuit constants for the tube 202 are such that a pulse from the brush circuit must coincide with a pulse from the read bus and then the relay 203 will be energized to pick up its contacts. It will be noted that there is a switch 211 that is located on and actuated by the relay 203. This switch 211 closes a circuit to the reset bus as indicated. The reset bus normally carries zero or ground potential which will act to hold the tube 202 conducting, regardless of whether brush and read pulses are present. In this manner, once the relay 203 is actuated or energized, it will lock up and hold until a reset pulse is applied to the grid of the tube via the switch 211.

In Figs. 9a and 9b there is illustrated the circuit for a portion of the timing pulse shaper 37, illustrated in Fig. 1. It will be observed that this circuit is one that is common to a given number of digital-analogue converters. As indicated above, there is employed in each such converter certain control pulses for timing the sequence of operation of a group of relays that switch the voltage divider circuits so as to produce an output signal that has been accurately calculated for predetermined timed intervals throughout a given problem that is to be fed into the computer under test. The read pulse, which is employed to furnish the pulse for the "read bus" indicated in Fig. 7, is originated by means of the disc 194 (Fig. 8) or the disc 195, depending upon whether the pulse is that for the "A" group or the corresponding pulse for the "B" group of relays controlling the switches for each voltage divider network. There is a phototube 215 that has its anode connected to a terminal 216 that will have a D.C. voltage supply connected thereto, which may be a positive voltage of about 75 volts. The cathode of the phototube 215 is connected via a shielded lead 217 to the grid circuit of a tube 218 that is connected to act as a cathode follower. It will be observed that the pulse which is generated in the phototube 215 is that which is controlled by the introduction of light from a light source, e.g. the shielded light source 198 illustrated in Fig. 8, and this pulse is passed along from a point 219 in the cathode circuit of the tube 218 to the grid circuit of an amplifier tube 220. The pulse then continues via the plate circuit 220 over a circuit including a resistor 221 to the grid circuit of a phase splitter tube 224. Two signals are simultaneously passed on from the phase splitter tube 224 via a wire 225 in the plate circuit, which is connected to a resistor 226, that is in turn connected to the grid circuit of a thyratron tube 227. The other signal as developed at the phase splitter tube 224 is carried via a resistor 228, in the cathode circuit of tube 224, to the grid circuit for another thyratron tube 229. Thyratron tubes 227 and 229 are connected together in a well-known manner, to produce a thyratron flip-flop arrangement. An output signal from the thyratron flip-flop pair of tubes 227 and 229 is generated at a point 232 that is directly connected to the cathode of tube 227. The signal here generated is passed on via a plurality of shielded leads as indicated in the drawing, one being for each digital-analogue converter. The pulse here generated is a sharp pulse having short-time duration, that is employed for a drop-out check. It will be noted by referring to Fig. 6 that the appearance of a drop-out check pulse 233 is timed to correspond with the leading edge of its corresponding read pulse which is a pulse 234, as shown in Fig. 6. It will be noted that there are shown in Fig. 9a a plurality of shielded leads 235 that are all connected to the single point 232. Each of these lead to the individual drop-out check circuit for the digital-analogue converters, which circuit will be set forth in greater detail below.

Continuing with the generation of read pulses by the timing pulse shaper circuit being described, there is shown in some detail one of the drop-out check circuits over which the short duration drop-out check pulse (that was just described above) is transmitted. Following from the point 232 over a shielded lead 238 and via a switch 239, the circuit may be traced over a wire 240 (Figs. 9a and 9b) to a wire 241 which leads to a group of relay switches indicated generally by the reference number 242. These switches, shown in the group indicated at 242, constitute contacts of the relays employed in a given group of relays for one digital analogue converter. The circuit is so arranged that when all of the group of relays 242 are de-energized, i.e. have dropped out, the circuit may be continued from wire 241 over the illustrated contacts of the group of relays 242, to a set of relay contacts 243. These relay contacts 243 are shown open in Fig. 9b, but will be closed at the time when a drop-out check is being effected. This is because these contacts 243 are on the transfer relay associated with the opposite group of relays for the particular digital-analogue converter that is under consideration. This circuit then may be continued to a point 244 which has a resistor 245 connected thereto and which is also connected to the grid circuit of an electron tube 246, via a condenser 247 and a resistor 248.

Tube 246 is one of a pair of electron tubes 246 and 249 that are cross-connected to form a flip-flop circuit to act as a gate for producing a read pulse to be applied to a read bus connected to a given one of the two groups of relays for each of the plurality of digital-analogue converters that are employed. Presence of the short duration trigger pulse at the grid of flip-flop tubes 246 and 249 (as introduced by the circuit including condenser 247 and resistor 248) proves the drop-out check. In other words, unless all of the relays involved in this check have dropped out to close the series connected contacts indicated at 242, this pulse will not be received by the read gate flip-flop tubes 246 and 249. When the pulse is received by these tubes, however, it acts to flip the circuit over so that the one tube of this pair which was conducting now becomes non-conducting and vice-versa, so that a read pulse is gated out via the plate circuit of tube 249 over a wire 250 and a wire 251 to the grid circuit of a tube 252, through a resistor 253. The leading edge of a read pulse is thus initiated by the flipping of tubes 246 and 249 with the arrival of the trigger pulse of short duration which has traversed the drop-out check circuit.

The creation of the read pulse that is applied to the read bus is affected in a cathode following manner in the circuit of tube 252. Tube 252 has a negative voltage of a given amplitude connected to its cathode through a resistor 254 that is connected to a negative supply terminal 255. The read pulse is generated by a state of conduction of the tube 252 such that its cathode is raised from the negative potential applied to terminal 255 to approximately zero or ground potential. This pulse is carried over a resistor 256 to a wire 257 that leads to, or is part of, a read bus corresponding to the read bus illustrated in Fig. 7. A rectifier 258 is connected from the read bus wire 257 to ground, as shown, in order to insure that the potential of the read pulse does not go above zero.

The termination of each read pulse is controlled from the phototube 215 (by means of the disc in conjunction therewith) and the action of the pulse generating circuit for ending the pulse may be traced as follows: The trailing edge of each pulse set up by means of the phototube 215, is transmitted over a circuit including the cathode follower tube 218, the amplifier tube 220, the phase splitter tube 224 to the thyratron flip-flop tubes 227 and 229. This trailing edge of the pulse then acts upon the thyratron flip-flop tubes to return them to their original state. As the thyratron pair is flopped back, a pulse is produced in the cathode circuit of tube 229 that is carried over a wire 261 to a switch 262 and continuing on via a wire 263 (Figs. 9a and 9b) to a group of shielded leads including a lead 264 that is in the grid circuits of read gate flip-flop tubes 246 and 249. It will be appreciated that the other shielded leads corresponding to lead 264 are those which lead to a corresponding read gate circuit that is to be found in each individual digital-analogue converter. This pulse corresponding with the trailing edge of the phototube controlled read pulse (which is sharp and of short duration) is then fed via the lead 264 and a condenser 265 as well as a resistor 266 to the grid circuits of read gate flip-flop tubes 246 and 249. The action of this pulse flops this pair of tubes back to their original state and consequently terminates the read pulse which was set up on wire 257 under control of the tube 252. Thus a read pulse is set up on a separate read bus for each group of relays corresponding to one of the voltage divider networks for each digital-analogue converter. The read pulse thus generated is timed directly from the pulse created by the phototube 215 which is that corresponding to one of the phototubes 199 illustrated in Fig. 8. At the same time a drop-out check will have been effectuated by the passage of the read trigger pulse over a series drop-out circuit.

Referring to Figs. 6 and 7, and in connection with the resetting of each of the relays in the group that were energized under control of a given line on the program set up on the tape 25, it will be noted that there must be a reset pulse created for releasing each of such tape-control relays which had been picked up. Referring to Fig. 6 it will be observed that a reset pulse 271 commences at the termination of the transfer pulse for that group, which will be explained in detail below. Also, this reset pulse involves a certain relay (Fig. 9b) that has a set of contacts 272 thereon. The closing of these contacts 272 produces the leading edge of a reset pulse on a wire 273 that is connected to a point between a pair of voltage divider connected resistors 274 that are connected in series between ground and a negative supply voltage at a terminal 276. This reset pulse is the pulse which acts in the grid circuit for each relay tube, e.g. tube 202 (Fig. 7), to release the holding circuit therefor. The termination of such reset pulse is effected by the action of the leading edge of each read pulse as it appears on the wire 257, by means of a rectifier 277 that is connected from the wire 257 to ground via one of the resistors 274. In this manner the potential on wire 273, which is the reset bus, is carried to ground potential or zero volts by the arrival of the read pulse on wire 257, after which the energization of the transfer relay (that has contacts 272 thereon) will open the lower contacts of switch 272 so as to remove the negative supply voltage and connect wire 273 firmly to ground potential via the illustrated circuit.

As pointed out above, the output signal from each digital-analogue converter is made up of a series of signals as precalculated for given intervals of time and punched into the tape 25 to be produced as the output of two groups of relays, which control the connection of the various branches for each of two voltage divider networks. These two networks are connected alternately in such a manner as to create half steps of output signal from one to the other of the output voltages set up on each network. In order to create such half steps, a system of switching from one network to the other is provided including a circuit such that the networks are sequentially connected to the output with the combined or average signal connected in the interval between the connection of each of the two networks separately. For example, to employ the terminology heretofore used in connection with the two voltage divider networks, one of these may be termed the "A" group, while the other is entitled the "B" group. The switching provided is such as to connect first either the "A" or "B" group alone to the output, and then introduce the other group at the same time, so as to have the average signal of both groups together. Then the first group is disconnected, leaving the second group only, and during this time the first group is switched intra group to provide a new signal, as precalculated for the next succeeding interval. This first group is then reconnected while the second group remains, to give a new average value of the two groups, and then the second group is disconnected, leaving the first group by itself. A graphic illustration of this half step output arrangement is included on the bottom line of Fig. 6 and entitled "output." It will be noted that whereas one complete cycle for either group "A" or group "B" is eighty milliseconds in duration, the output signal is changed every twenty milliseconds, i.e. four times per cycle. This is the result of the switching described above.

In order to create this desired switching, there are employed certain relays which may be termed "transfer relays" which are under the control of a timing circuit that has its primary control initiated by one of the discs 196 or 197, illustrated in Fig. 8. These discs 196 and 197 are arranged to have a pulse created by the passage of light that has a duration of twenty milliseconds, while the remaining portion of each cycle (one revolution of the disc 196 or 197) is covered by a non-passage of light, or dark period, that is sixty milliseconds long. Referring to Fig. 10 there is shown a phototube 281 that has its anode connected to a terminal 282 having a positive voltage supply connected thereto, and its cathode is connected via a shielded lead 283 to the grid circuit of a cathode follower tube 284. The pulse is then passed on from the cathode circuit via a shielded lead 285 to the grid of an amplifier tube 286. The amplifier tube 286 will invert the pulse, so that it is the dark or sixty millisecond portion of the pulse that is passed on, via a wire 287, to the grid of a cathode follower and stabilizer tube 288. In the cathode circuit of the stabilizer tube 288 there are three cold cathode regulator tubes 289 connected in series and connected to a resistor 290 that has an adjustable tap 291 which leads to the grid of another cathode follower tube 292. The output of the cathode follower tube 292 includes a plurality of shielded leads connected to a wire 295. One of these shielded leads is a lead 296 that goes to the grid of a transfer relay tube 297 via a resistor 298. There is a transfer relay 299 in series with the tube 297. It will be noted that there is a transfer relay tube and relay for each of the groups of relays, i.e. one for group "A" or group "B," found in each digital-analogue converter. Of course, the transfer relay tube 297 and each of the other three corresponding tubes illustrated in Fig. 10 will be the transfer tubes for only one of the two groups of relays "A" or "B," and there will be identical circuits for controlling a similar transfer relay tube for the other group.

Actuation of each transfer relay tube, e.g. tube 297, is under control of the phototube pulse as generated by phototube 281. However, there is a check circuit involved which will now be described and which concerns the even-odd check (E/O Chk.). To produce this check there is an even-odd circuit including contacts on the various relays which are under control of the tape 25 and which set up a series circuit that will be described in greater detail below. This even-odd circuit, when complete, will allow the passage of a read pulse 301 that is schematically indicated above a wire 302 in Fig. 10. The arrangement is such that a diode rectifier tube 303 is connected with its anode lead going to the grid of the transfer relay tube 297 via relay contacts 304. These contacts 304 are closed when the transfer relay that is controlled by tube 297 is not actuated. The state of conduction or non-conduction of diode 303 is controlled by a tube 305 that has its plate directly connected to the cathode of diode 303. The cathode of tube 305 is connected to a terminal 306 that is supplied with a high negative voltage. Connected to wire 302 in series with a resistor 307 there is a negative voltage supply at a terminal 308. The amplitude of this negative voltage supply at terminal 308 is equal to the amplitude of the read pulse indicated at 301. Consequently, so long as a read pulse is existing on wire 302 the combination of diode 303 and tube 305 remains in a state such that tube 303 is non-conducting, i.e. remains cut off. Therefore, the transfer pulse as generated at phototube 281, may be effective to cause tube 297 to pass current and actuate the relay in circuit therewith. Consequently this arrangement indicates a complete circuit through the even-odd check circuit. If there had been a failure in the circuit checked, the even-odd circuit would have been open and the read pulse 301 would not have arrived to maintain diode 303 cut off. Consequently, the transfer pulse arriving at the grid of tube 297 would have caused diode 303 to conduct and thus shunt this pulse through the diode circuit, and not allow it to activate the tube 297 and so actuate the relay 299 in circuit therewith. If, on the other hand, the check circuit is complete and the read pulse 301 appears so as to maintain diode 303 cut off, the tube 297 will be fired. Then upon actuation of the relay 299 in circuit with tube 297, contacts 304 will be opened so as to maintain the tube 297 conducting, irrespective of conditions in the diode 303 circuit, throughout the duration of the pulse as generated at phototube 281.

The timing of the generation of the transfer pulse, including the even-odd check, is all illustrated on the diagram shown in Fig. 6. It will be observed that a pulse 309 labeled "A E/O Chk." is shown as commencing at the same time as the beginning of an "A" transfer pulse 310, and ending about five milliseconds thereafter. This then represents an initial portion of the read pulse 301 (Fig. 10) which traversed the even-odd check circuit and was effective in maintaining diode 303 cut off, during the time the contacts 304 were closed. The opening of contacts 304 is the termination of this even-odd check pulse 309 (Fig. 6), since no further effect is had in the circuit of transfer relay 299 after contacts 304 are open.

*Constant inputs for computer*

It is to be noted that certain inputs to the computer being evaluated are constants, as indicated by element 39 in Fig. 1. These inputs must have the required degree of accuracy as do the variable input signals. One way of obtaining the required accuracy is by employing a voltage divider network like those employed in a digital-analogue converter, but without the program control therefor. The desired constant is merely set up by plugging or otherwise manually switching the network relays to obtain a given constant signal output. It might be found preferable to obtain the constant signal to be used in the evaluator, by matching a variable potentiometer, or the like, against a voltage divider network and then use this preset signal for the constant in the evaluator. As an aide in obtaining such a matching of a potentiometer output signal against a voltage divider network output, an error detection circuit like that described above may be used.

*Operation*

By way of review, the operation of the system may be briefly followed as follows:

To begin with, a sample problem or series of problems for the computer, e.g. the bombing computer 21, is figured out so as to test the computer over its full normal range of operation. Having calculated such a problem, the computer input signals to produce operation according to this problem, are calculated accurately for predetermined intervals of time, e.g. every forty milliseconds. This prodigious task may be accomplished by employing a calculating machine such as an International Business Machines' Type 701. In this manner, cards may be punched to represent each signal value at each interval of time. Then such card representations will be transferred to tapes, e.g. the tape 25 in Fig. 1, where they act to control signal generators. These signal generators are in the nature of digital to analogue converters and are represented by the block 23 in Fig. 1. Such converters produce a given signal having a desired accuracy as determined by the information carried on a tape, there being one tape section associated with each digital analogue converter. The accuracy of these input signals must be of a higher order than the maximum expected accuracy of the bombing computer 21, being evaluated. Next, the signals as thus produced are fed into the computer. In this manner, the signals fed to the computer have a predetermined accuracy and represent given conditions for the problem that is to be solved.

While the predetermined computer input signals are set up as indicated above, another group of signals will have been calculated in the same manner. This group of calculated signals represents the output signals of the computer at various output points therein and are calculated to a desired accuracy. These signals are precalculated for every forty milliseconds in the same manner as the computer input signals described above, and are punched into tapes likewise in the same manner as the computer input signals. These tapes now control other digital-analogue converters to thereby produce signals having a predetermined accuracy and these signals which may be termed "predicted output signals" are fed into the error detector circuit 27.

Simultaneously with the feeding into the computer 21 of predetermined known input signals, there will be generated the predicted accurate output signals which the computer should produce in order to solve the given problem within a desired degree of accuracy. Consequently, in order to determine the errors in the operation of the computer, its actual output signals are also fed into the error detector circuit 27 where such actual output signals are compared with the predicted signals and any difference represents the error which is existing in the computer under test.

The operation will now be set forth in greater detail by following the operation of a given signal or signals through the system with reference to the detail circuit diagrams as well as the overall block diagram.

First, in order to produce a given signal as predetermined from exact mathematical calculations (this signal may be either an input signal for the computer being evaluated or a predicted output signal therefrom), a given one of the digital-analogue converters described above will be actuated under control of its corresponding tape. The operation of this actuation may be traced on the detailed showings as follows: (Fig. 8) each of the brushes 209 are in the grid circuit of an electron tube 314 (Figs. 11a and 11b). In the specific evaluator disclosed, thirteen of the brushes 209 are connected to a group of terminals 315 through 327 (Fig. 11a) respectively. Terminals 315, 316 and 327 are connected to corresponding relays A1 and B1, A2 and B2, and A13 and B13, as shown in Figs. 11a and 11b. The basic circuit for each tube 314 is that shown in Fig. 7, and may be traced on Figs. 11a and 11b as follows: For relays A1 and B1 (these relays operate in sequence, alternately from successive lines of information as punched into the tape 25) a circuit from ground will be connected via the brush 209, when the brush encounters a hole punched in the tape, to terminal 315, a wire 335 to a resistor 336 (which corresponds to resistor 208 in Fig. 7). Another wire 337 leads to a wire 338 which in turn is connected to one side of a resistor 339 which corresponds to resistor 207 of Fig. 7. The other side of resistor 339 is connected via a wire 340 to a wire 341 which leads to a terminal 342 that is connected to a negative voltage supply, as indicated, and in correspondence with the negative supply at terminal 206 of Fig. 7. The timing of brush pulses is shown in Fig. 6 where a pulse 343 has a duration of about twenty-two and one half milliseconds with two pulses occurring each cycle (there being two lines of tape information read each cycle, one for A group of relays and the other for B group).

Following the closing of the brush 209 circuit, traced above, with a delay of about seven and one half milliseconds, the read pulse is generated as described above, e.g. the "A" read pulse is generated as described above in connection with Figs. 9a and 9b, and is applied to the grid circuits of all of the A group of relays simultaneously over a circuit which may be traced for the A1 relay as follows: The wire 257 (Fig. 9b) leads to a terminal 346 (Fig. 11b) which has a wire 347 connected thereto. Wire 347 leads to a wire 348 (Fig. 11a) which in turn leads to all of the grids of tubes 314 via a resistor in each case, e.g. a resistor 349 in the grid circuit of relay A1's tube 314.

It will be noted that there is a separate circuit for the "B" read pulse (e.g. a pulse 350 shown in Fig. 6), and it will be understood that there is a duplicate circuit, like that shown in Figs. 9a and 9b, for generating this "B" group read pulse. Such duplicate circuit (not shown) is connected to a terminal 351 of Fig. 11b.

The third grid circuit for each tube controlled by the tape is that shown in Fig. 7 which includes the relay switch contacts 211 and leads to the reset bus as indicated. This circuit may be traced on the detailed circuit of Figs. 11a and 11b as follows: Beginning at a terminal 354 and going over a wire 355 to the "b" switch contacts of each "A" group relay, e.g. to contacts A1–b (now closed if the brush 209 for relay A1 encounters hole punched for the reading being considered) and then directly to the grid of tube 314 that is in circuit with relay A1. It will be remembered that the reset pulse, for breaking the holding circuit thus formed for each tape controlled "A" group relay, is generated as described above in connection with Fig. 9b, and is applied to the wire 273 there shown. It will be understood that the wire 273 will be connected to the terminal 354 of Fig. 11b if the pulse shaping network is that for the group "A" set of relays, while it will be connected to a terminal 356 if the pulse shaping network is that for the group "B" set. The timing of this reset pulse has been described and pointed out in connection with Fig. 6 and the reset pulse 271. It will be noted that the timing of the energization of the "A" and "B" set of relays is indicated on the lower bracketed group of Fig. 6, marked "relay coils." For example, the line marked "A" digit shows the timing of the relays A1 through A16 of Fig. 11a, it being understood that only those relays whose circuits are under control of a hole punched in the tape 25 will be actuated each time a line is read on the tape.

Details of the voltage divider networks including the switches and relays for actuating the switches are illustrated in Figs. 12a and 12b. It will be noted that the various relays are given reference numbers that indicate the group to which they belong, i.e. "A" or "B," while the contacts for the various relays are marked with a lower case letter which relates them, as a group, to a relay by which such group is operated. The term "relay" is used throughout this description interchangeably with relay coil as it is to be understood that the necessary physical structure for each relay may take various forms and can be represented by the schematic showing of a solenoid or coil. It will be noted that the circuits of Figs. 12a and 12b are identical with that of Fig. 2 in so far as the voltage divider network is concerned. Therefore, no additional explanation is necessary other than to point out that parallel circuits are employed in the majority of switching points shown in Figs. 12a and 12b, using two sets of contacts for a given operation in order to insure low contact resistance for maintaining the required accuracy in the output signals from the network and for more reliable operation. It will be noted that besides the relays of each group, e.g. relays A1 through A13, that effect the switching in the voltage divider network, there are two additional relays in each group, e.g. A14 and A15, which control the sign and scale factor respectively as clearly explained above in connection with the above simplified diagram of Fig. 2.

It is pointed out that a convention is employed in the circuit diagrams whereby all relay switch contacts are illustrated in the deenergized state, and any exceptions to this convention are specifically pointed out.

Specific switching operation within the voltage divider networks themselves have been adequately described above in connection with Fig. 2 and Fig. 3 and need not be repeated here. However, operation of the transfer relays for switching to obtain the half step signal outputs will be reviewed in connection with Figs. 12a and 12b. It will be observed that a terminal 361 is the output terminal for the signals as generated by the digital-analogue converter that is composed of the "A" and "B" networks illustrated in Figs. 12a and 12b. Of course the circuit for the signals as produced at this output terminal 361 must include a ground circuit to be complete. The transfer switching as previously described correlates the outputs of the two voltage divider groups, and the operation of the detailed circuit of Figs. 12a and 12b will be clear by referring to the timing diagram of Fig. 6. In Fig. 12b, relay A17 will be actuated for periods indicated by the line marked "'A'XFR" within the bracket indicating "relay coils." The schematically indicated signals, shown on the bottom line of Fig. 6 have a lag of five milliseconds after each transfer relay coil actuation. The reason for this is merely to provide a certain amount of time lag between the energization and deenergization of the relay coils and the closing and opening of the switch contacts actuated thereby.

The generation and timing of the transfer pulses to control the transfer relays, e.g. relays A17 and B17 have been fully described in connection with Fig. 10 and need not be repeated. It is pointed out that the relays A17 and B17 of Fig. 11a are shown with an electron tube 364 and 365 respectively in circuit therewith. These tubes 364 and 365 each correspond to the tube 297 shown in Fig. 10, and a terminal 366 (Fig. 11a) for the tube 364 as well as a terminal 367 for the tube 365, are the points at which the A and B group transfer pulses are received. The time relationship of these pulses is shown in Fig. 6, e.g. a transfer pulse 310. A resistor 368 in the grid circuit of tube 364 corresponds to the resistor 298 shown in Fig. 10, as in like manner does a resistor 369 in the grid circuit of tube 365. To complete the orientation of the transfer relays A17 and B17, it is to be noted that wires 372 and 373 respectively lead from the b contacts of relays A17 and B17 to terminals 374 and 375 respectively. These terminals will be each connected to a diode such as diode 303 of Fig. 10.

Since the various operation checks that are employed to indicate any failure in the switching operations of a digital-analogue converter have been discussed in considerable detail above, it is only necessary to correlate these checks to the detailed circuit diagram of Figs. 11a and 11b.

The circuit for the drop-out check is that for carrying the short sharp trigger pulse occurring once each cycle for each relay group, as indicated in Fig. 6, e.g. pulse 233. This circuit is a series one for a set of contacts in each relay of one group (A or B) and may be traced on Figs. 11a and 11b as follows: Taking group A circuit, the trigger pulse is fed into a terminal 378 (Fig. 11b) marked "'A' TRIG." and over a wire 379 (Figs. 11b and 11a) to contacts f of relay A15 and then over the obvious series circuit to test the drop-out of all of the A group of relays including the transfer relay A17 and the "B" transfer relay contacts shown open but which are closed at the time of "A" drop-out check. Then the circuit leads back to a terminal 380 via a wire 381. The terminal 380 will be connected to a point in the corresponding read pulse circuit, e.g. point 244 of Fig. 9b.

The even-odd check is made to determine to a quite reliable degree of probability, that all of the relays which were programmed to operate in a given cycle, did in fact operate. This involves the use of one extra bit of information on the tape, i.e. a place for a hole to be punched or not in each line of holes across the tape. Such hole acts in the grid circuit of the tube 314 for the A16 relay or the B16 relay depending upon which line of holes is being read. The presence or absence of this hole depends upon whether the predetermined signal to be fed out of the voltage divider network involves the use of an even or an odd number of relays in setting up the circuit to the desired signal. The circuit for obtaining this result may be traced for the A group on the detailed circuit of Figs. 11a and 11b as follows: The read pulse is introduced at the terminal 346 and travels over the wire 347 (Figs. 11b and 11a) to a wire 384 which leads to the "a" contacts of the sign relay A14. The two stationary contacts of these "a" contacts of relay A14 lead into a criss-cross arrangement that leads out via the "e" contacts of even-odd relay A16 to a wire 385 (Figs. 11a and 11b) which in turn leads to a terminal 386 that is connected to the even-odd check circuit for that group of relays, e.g. the wire 302 of Fig. 10. The criss-cross circuit arrangement is such that whenever an odd number of the relays A1 through A15 are energized, the even-odd relay A16 will be left deenergized. But if the number of relays of the group including A1 through A15 to be energized is to be an even number, then the relay A16 will be energized and so the total number of relays energized, counting A16 as well, will always remain odd. Thus a circuit will be completed through this criss-cross network whenever the proper number of relays is energized, i.e. the contacts thereof are closed.

In order to complete the correlation of the detailed circuit diagrams including those shown in Fig. 13 and Fig. 14, it will be noted that the phase corrector circuit of Fig. 13, together with the balanced amplifier circuit of Fig. 14, make up the error detector that is generally described above in connection with Fig. 5. Assuming the digital-analogue converter, the circuit of which is shown in Figs. 11a and b, and 12a and b, is programmed to provide a predicted signal output at the terminal 361 (Fig. 12b), this terminal 361 will be connected to a terminal 389 (Fig. 13) which corresponds to the wire 156 of Fig. 5. Then the computer output signal which corresponds to the predicted signal, will be connected to a terminal 390 (Fig. 13) which corresponds to a point 157 in Fig. 5. Other terminals shown in Fig. 13 include a plate supply terminal 392, a negative supply terminal 393, and a common signal or grounded terminal 394. The relation of these terminals to the circuit of Fig. 13 will be clear to one skilled in the art.

To continue the correlation, it will be seen that a terminal 397 will be connected to one of a pair of input terminals 398 and 399 of the balanced amplifier shown in detail in Fig. 14, while the terminal 361 (Fig. 12b) carrying the predicted signal will be connected also to the other input terminal of the input terminals 398 and 399 (in addition to the terminal 389 in Fig. 13). Also, output terminals 402 and 403 of the balanced amplifier (Fig. 14) will be connected to terminals 404 and 405 of the phase corrector (Fig. 13). A terminal 406 of the phase corrector has a reference voltage applied thereto as explained in connection with Fig. 5. The wire 161 of Fig. 5 corresponds to reference terminal 406 of Fig. 13.

Alarm and starting conditions

It is to be noted that starting conditions must be varied somewhat from normal operating conditions, because the evaluator would not start otherwise. This is because of the nature of some of the checks performed.

An alarm for indicating malfunction is included in connection with the drop-out check circuits. Such an alarm might take various forms but that employed is illustrated in Fig. 9b. There is an alarm relay 409 that is controlled by an electron tube 410. A source of D.C. plate voltage is connected to a terminal 411, while the cathode of tube 410 is connected to ground via a resistor 412. The alarm relay may be connected to activate any desired alarms or visual indications, e.g. a light or a bell or both. The circuit for such indicators is not shown since it would be obvious to anyone skilled in the art.

The control of alarm relay tube 410 is effected by a circuit connected to the grid thereof. This includes a plurality of such circuits as indicated by the wires 416, there being one circuit for each digital-analogue converter. The circuit for a given converter is shown in connection with the relays for switches 242. As shown, the upper or energized contacts for switches 242 are connected in parallel to the grid of the tube 410 so that the drop-out check pulse will be carried to the grid of the tube 410 to cause it to become conducting and so energize the relay 409 to give the alarm indication.

To start the evaluator operating, the "A" group drop-out check must be eliminated. Therefore, there is a switch 417 (Fig. 9b) that acts to shunt the drop-out check circuit during the starting period. This switch may be automatically operated if desired and the timing for operation of this switch is indicated in Fig. 6 at the line marked "'A' DO cutout." It will be noted that in order to avoid the actuation of the alarm indication during this starting period there is a cut-out arrangement that includes a switch 419 (Fig. 9b) to shunt the relay 409. The timing of the operation of this alarm cut-out switch 419 is shown on the two lines below the "A" drop-out cut-out line on the timing diagram.

While a specific embodiment of the invention has been described in some detail in accordance with the applicable statutes, this is not to be taken as in any way limiting the invention, but merely as being descriptive thereof.

It is claimed:

1. A dynamic evaluator for continuously checking performance of a computer having an analogue output signal comprising first digital to analogue conversion means for generating an input signal for said computer, second digital to analogue conversion means for generating an accurate predicted signal corresponding to said computer output signal, means for comparing said computer output signal with said predicted signal to produce a difference signal the amplitude of which varies as a function of the dynamic error of the computer output, said comparing means including a phase correction means for maintaining said computer output signal and said predicted signal in the proper phase relationship to render the amplitude of said difference signal meaningful.

2. A dynamic evaluator for continuously checking performance of a computer having an analogue output signal comprising first digital to analogue conversion means for generating an input signal for said computer, second digital to analogue conversion means for generating an accurate predicted signal corresponding to said computer output signal, means for comparing said computer output signal with said predicted signal to produce a difference signal the amplitude of which varies as a function of the dynamic error of the computer output, said comparing means including a phase correction means for maintaining said computer output signal and said predicted signal in the proper phase relationship to render the amplitude of said difference signal meaningful and accurate, and means for recording said difference signal continuously in order to indicate the dynamic performance of the computer over a given period of time.

3. A dynamic evaluator for continuously checking performance of a computer having a plurality of analogue outputs, at least one of said outputs being dependent upon a manually controlled correction factor comprising means for generating predetermined variable input signals for said computer, means for generating accurate predicted signals for comparison with said computer outputs, and means for comparing said computer outputs with said predicted signals to produce error signals the amplitude of which vary as a function of the dynamic errors of the computer outputs including circuit means for feeding at least one error signal back into the computer to supply the said manually controlled correction factor automatically.

4. A dynamic evaluator for continuously checking performance of a computer having a plurality of analogue outputs, said computer having a three-wire input for receiving interrelated signals thereon comprising means for generating predetermined variable input signals for said computer, means for combining two interrelated predetermined signals to produce three interrelated signals for application to said three-wire input means for generating accurate predicted signals for comparison with said computer outputs, an dmeans for comparing said computer outputs with said predicted signals to produce difference signals the amplitude of which are functions of the dynamic errors of the computer outputs being measured.

5. A dynamic evaluator for continuously checking performance of a computer having an analogue output signal comprising first digital to analogue conversion means for generating an input signal for said computer, second digital to analogue conversion means for generating an accurate predicted signal corresponding to said output signal, both said conversion means including a voltage divider network with switching means to predetermine the output of the network at a given setting thereof and means for comparing said computer output signal with said predicted signal to produce a difference signal the amplitude of which varies as a function of the dynamic error of the computer output.

6. A dynamic evaluator for continuously checking the performance of a computer adapted to receive certain input signals and provide output signals which represent the computer solution for said input signals, a plurality of voltage divider networks with switching means to predetermine the output of the networks at any given setting thereof for producing said input signals and predicted output signals, said predicted output signals representing the true solution which said computer should provide, program control means for actuating said switching means and means for comparing said computer output signals with said predicted output signals to produce error signals which are a function of the dynamic error in the computer solution.

7. A dynamic evaluator for continuously checking the performance of a computer adapted to receive certain input signals and provide output signals which represent the computer solution for said input signals, a pair of voltage divider networks with switching means to predetermine the output of the pair of networks for producing each of said input signals and each of predetermined predicted output signals, said predicted output signals representing the true solution which said computer should provide, program control means for actuating said switching means and means for comparing said computer output signals with said predicted output signals to produce error signals which are a function of the dynamic error in the computer solution.

8. A dynamic evaluator for continuously checking the performance of a computer adapted to receive certain input signals and provide output signals which represent the computer solution for said input signals, a pair of voltage divider networks with switching means to predetermine the output of the pair of networks for producing each of said input signals and each of predetermined predicted output signals, said predicted output signals representing the true solution which said computer should provide, a program tape for controlling actuation of said switching means with each pair of networks, said tape having programmed thereon at intervals encoded controls for producing predetermined instantaneous values of said various signals, and means for comparing said computer output signals with said predicted output signals to produce error signals which are a function of the dynamic error in the computer solution.

9. A dynamic evaluator for continuously checking the performance of a computer adapted to receive certain input signals and provide output signals which represent the computer solution for said input signals, a pair of voltage divider networks with switching means to determine the output of the pair of networks for producing each of said input signals and each of predetermined predicted output signals, said predicted output signals representing the true solution which siad computer should provide, a program tape for controlling actuation of said switching means with each pair of networks, said tape having programmed thereon at intervals encoded controls for producing predetermined instantaneous values of said various signals, means for comparing said computer output signals with said predicted output signals to produce error signals which are a function of the dynamic error in the computer solution, and means for recording said error signals to indicate and produce a continuous record of the dynamic error in the computer solution.

10. A dynamic evaluator for continuously checking the performance of a computer adapted to receive certain input signals and provide output signals which represent the computer solution for said input signals, programmed means for generating said input signals and said predicted output signals, said programmed means including for each signal a plurality of voltage divider networks, means for setting a given output on each of said networks as determined by the program, means for switching from the output of one network to the output of another network in order to vary the signal in steps, each step producing a signal having a predetermined degree of accuracy, said predicted output signals representing the true solution which said computer should provide and means for comparing said computer output signals with said predicted output signals to produce error signals which are a function of the dynamic error in the computer solution.

11. A dynamic evaluator for continuously checking the performance of a computer adapted to receive certain input signals and provide output signals which represent the computer solution for said input signals, programmed means for generating said input signals and predicted output signals, said programmed means including for each signal a plurality of voltage divider networks, means for setting a given output on each of said networks as determined by the program, circuit means including switching for producing a signal as determined by at least two of said networks in sequence, said last-named signal being variable in fractional steps from one network output to the next by combining at least two network outputs for an average signal between production of the signal by each network alone, said predicted output signals representing the true solution which said computer should provide, and means for comparing said computer output signals with said predicted output signals to produce error signals which are a function of the dynamic error in the computer solution.

12. A dynamic evaluator for continuously checking the performance of a computer adapted to receive certain input signals and provide output signals which represent the computer solution for said input signals, programmed means for generating said input signals and predicted output signals, said programmed means including for each signal a plurality of voltage divider networks, means for setting a given output on each of said networks as determined by the program, circuit means including switching for producing a signal as determined by at least two of said networks in sequence, said last-named signal being variable in fractional steps from one network output to the next by combining at least two network outputs for an average signal between production of the signal by each network alone, said predicted output signals representing the true solution which said computer should provide, means for comparing said computer output signals with said predicted output signals to produce error signals which are a function of the dynamic error in the computer solution and means for recording said error signals to indicate and produce a continuous record of the dynamic error in the computer solution.

13. A dynamic evaluator for continuously checking the performance of a computer adapted to receive certain input signals and provide output signals which represent the computer solution for said input signals, programmed means for generating said input signals and predicted output signals, said programmed means including for each signal a pair of voltage divider networks, means for setting a given output on each of said networks as determined by the program, circuit means including a dummy load and switching for producing a signal as determined by said pair of networks in alternation and having an overlap between alternate network outputs in order to produce half steps in the changes produced in switching from one network to the other, said predicted output signals representing the true solution which said computer should provide, and means for comparing said computer output signals with said predicted output signals to produce error signals which are a function of the dynamic error in the computer solution.

14. A dynamic evaluator for continuously checking the performance of a computer adapted to receive certain input signals and provide output signals which represent the computer solution for said input signals, comprising a plurality of program tapes, one for each input signal and one for each predicted output signal, two relay networks controlled by each tape, switches actuated by each said relay network for determining the output of a voltage divider, circuit means being timed relative to said tape drive for connecting a pair of said voltage dividers alternatively to produce a predetermined variable signal, said signal varying step by step with half step changes because of an overlap between the alternative connection of each voltage divider, said predicted output signals representing the true solution which said computer should provide, and a comparison circuit to compare said computer output signals with said predicted output signals including a balanced differential amplifier having separate input signals circuits for receiving said signals to be compared, phase shift means in series with one of said amplifier input signal circuits, a summing network for receiving both of said signals to be compared, means for taking the quadrature of the output of said summing network, circuit means for feeding said quadrature into a first bridge the output of which is fed to said phase shift means for applying a corrective phase shift to said one signal whenever said first bridge is unbalanced, a second bridge connected to receive the output of said balanced differential amplifier across two adjacent legs on opposite sides of the bridge, a quadrature reference signal being fed across the diagonal of said second bridge so that said second bridge is unbalanced whenever the output of the balanced amplifier is out of phase with the in-phase reference signal, and means for causing unbalance of said first bridge when said second bridge is unbalanced in order to apply a phase correction to said one signal to maintain said compared signals in exact phase with one another so that the output of said balanced amplifier is an error signal which is a function of the dynamic error in the computer solution.

15. In a dynamic evaluator for continuously checking the performance of a computer adapted to receive problems in the form of input signals and provide output signals which represent the computer solution for said input signals: means for producing in a fixed time scale a train of computer input signals the value of which has been precomputed for each interval of said time scale, means for producing a train of predicted computer output signals in the same fixed time scale as said train of precomputed computer input signals, said predicted output signals representing the true solution which said computer should provide in the form of its output signals as the result of said precomputed input signals, and means for comparing said computer output signals with said predicted output signals to produce error signals which are a function of the dynamic error in the computer solution.

16. In a dynamic evaluator for continuously checking the performance of a computer adapted to receive problems in the form of input signals and provide output signals which represent the computer solution for said input signals: means for producing in a fixed time scale a train of digital computer input signals the value of which has been precomputed for each interval of said time scale, means for producing a train of digital predicted computer output signals in the same fixed time scale as said train of precomputed computer input signals, said predicted output signals representing the true solution which said computer should provide in the form of its output signals as the result of said precomputed input signals, means for converting said signal trains to analogue voltages, and means for comparing said computer output signals with the analogue voltages of said predicted output signals to produce error signals which are a function of the dynamic error in the computer solution.

17. In a dynamic evaluator for continuously checking the performance of a computer adapted to receive problems in the form of input signals and provide output signals which represent the computer solution for said input signals: record tape controlled means for producing in a fixed time scale a train of computer input signals the value of which has been precomputed for each interval of said time scale, record tape controlled means for producing a train of predicted computer output signals in the same fixed time scale as said train of precomputed computer input signals, said predicted output signals representing the true solution which said computer should provide in the form of its output signals as the result of said precomputed input signals, and means for comparing said computer output signals with said predicted output signals to produce error signals which are a function of the dynamic error in the computer solution.

References Cited in the file of this patent

UNITED STATES PATENTS

| | | |
|---|---|---|
| 2,267,936 | Morrison | Dec. 30, 1941 |
| 2,518,022 | Keister | Sept. 30, 1948 |
| 2,539,043 | Verneau | Jan. 23, 1951 |
| 2,580,768 | Hamilton et al. | Jan. 1, 1952 |
| 2,756,409 | Lubkin | July 24, 1956 |